United States Patent
Dunning et al.

(10) Patent No.: US 7,315,899 B2
(45) Date of Patent: *Jan. 1, 2008

(54) SYSTEM FOR CONTROLLING AND ENFORCING PLAYBACK RESTRICTIONS FOR A MEDIA FILE BY SPLITTING THE MEDIA FILE INTO USABLE AND UNUSABLE PORTIONS FOR PLAYBACK

(75) Inventors: Ted E. Dunning, San Diego, CA (US); Amir Doron, San Diego, CA (US)

(73) Assignee: Yahoo! Inc., Sunnyvale, CA (US)

( * ) Notice: Subject to any disclaimer, the term of this patent is extended or adjusted under 35 U.S.C. 154(b) by 152 days.

This patent is subject to a terminal disclaimer.

(21) Appl. No.: 11/117,620

(22) Filed: Apr. 28, 2005

(65) Prior Publication Data

US 2005/0187968 A1    Aug. 25, 2005

Related U.S. Application Data

(63) Continuation of application No. 10/291,210, filed on Nov. 8, 2002, now Pat. No. 7,024,485.

(60) Provisional application No. 60/337,939, filed on Nov. 9, 2001.

(51) Int. Cl.
*G06F 15/16* (2006.01)

(52) U.S. Cl. .................... 709/232; 709/236

(58) Field of Classification Search ........... 709/232, 709/236, 204; 345/428; 713/161; 205/59; 375/316; 370/477, 395.1

See application file for complete search history.

(56) References Cited

U.S. PATENT DOCUMENTS 3,568,156 A    3/1971    Thompson (Continued)

FOREIGN PATENT DOCUMENTS

AU    A53031/98    2/1997

(Continued)

OTHER PUBLICATIONS

Lauren B. Doyle, "Indexing and Abstracting by Association—Part 1," pp. 25-38, Santa Monica, Ca., Found in: *Readings in Information Retrieval*, Edited by Karen Sparck Jones and Peter Willett, Morgan Kaufmann Publishers, Inc., San Farancisco, CA, © 1997.

(Continued)

*Primary Examiner*—Le Hien Luu
(74) *Attorney, Agent, or Firm*—Greenberg Traurig, LLP

(57) ABSTRACT

Files are divided into parts and at least some of the parts are transmitted to a client using a communication channel. At least some of the transmitted parts are cached locally. This allows subsequent streaming playback of the file while using less bandwidth by transmitting the part of the file that hasn't been cached, and combining the cached parts with the transmitted parts. In some embodiments, files may be represented at a low quality level by a first data set, and at higher quality levels with additional data sets. Data sets are cached locally, so that during subsequent streaming playback of the file, the quality level of the playback may be improved by sending additional data sets using bandwidth that would otherwise be dedicated to transmitting the cached data sets.

76 Claims, 10 Drawing Sheets

U.S. PATENT DOCUMENTS

| | | |
|---|---|---|
| 4,384,329 A | 5/1983 | Rosenbaum et al. |
| 4,833,610 A | 5/1989 | Zamora |
| 5,062,143 A | 10/1991 | Schmitt |
| 5,182,708 A | 1/1993 | Ejiri |
| 5,241,674 A | 8/1993 | Kuorsawa |
| 5,303,150 A | 4/1994 | Komeda |
| 5,303,302 A * | 4/1994 | Burrows ............. 713/161 |
| 5,371,807 A | 12/1994 | Register et al. |
| 5,392,212 A | 2/1995 | Geist |
| 5,404,505 A | 4/1995 | Levinson |
| 5,418,951 A | 5/1995 | Damashek |
| 5,497,488 A | 3/1996 | Akizawa |
| 5,499,046 A | 3/1996 | Schiller et al. |
| 5,539,635 A | 7/1996 | Larson, Jr. |
| 5,548,507 A | 8/1996 | Martino |
| 5,583,763 A | 12/1996 | Atcheson |
| 5,592,511 A | 1/1997 | Schoen |
| 5,608,622 A | 3/1997 | Church |
| 5,616,876 A | 4/1997 | Cluts |
| 5,661,787 A | 8/1997 | Pocock |
| 5,675,786 A | 10/1997 | McKed |
| 5,678,054 A | 10/1997 | Shibata |
| 5,706,365 A | 1/1998 | Rangarajan |
| 5,708,709 A * | 1/1998 | Rose ............. 705/59 |
| 5,713,016 A | 1/1998 | Hill |
| 5,721,827 A | 2/1998 | Logan et al. |
| 5,726,909 A | 3/1998 | Krikorian |
| 5,740,134 A | 4/1998 | Peterson |
| 5,751,672 A | 5/1998 | Yankowsky |
| 5,754,938 A | 5/1998 | Herz |
| 5,758,257 A | 5/1998 | Herz |
| 5,764,235 A * | 6/1998 | Hunt et al. ............. 345/428 |
| 5,774,357 A | 6/1998 | Hoffberg |
| 5,790,423 A | 8/1998 | Lan et al. |
| 5,790,935 A | 8/1998 | Payton |
| 5,809,246 A | 9/1998 | Goldman |
| 5,819,160 A | 10/1998 | Foladare |
| 5,842,010 A | 11/1998 | Jain |
| 5,862,220 A | 1/1999 | Perlman |
| 5,862,339 A | 1/1999 | Bonnaure |
| 5,864,868 A | 1/1999 | Contois |
| 5,872,921 A | 2/1999 | Zahariev |
| 5,881,234 A | 3/1999 | Schwab |
| 5,883,986 A | 3/1999 | Kopec |
| 5,884,312 A | 3/1999 | Dustan |
| 5,898,833 A | 4/1999 | Kidder |
| 5,913,040 A | 6/1999 | Rakavy |
| 5,913,041 A | 6/1999 | Ramanathan |
| 5,926,207 A | 7/1999 | Vaughan |
| 5,930,526 A | 7/1999 | Iverson |
| 5,930,768 A | 7/1999 | Hooban |
| 5,931,907 A | 8/1999 | Davies |
| 5,941,951 A | 8/1999 | Day |
| 5,945,988 A | 8/1999 | Williams |
| 5,950,189 A | 9/1999 | Cohen |
| 5,956,482 A | 9/1999 | Agraharam |
| 5,960,430 A | 9/1999 | Haimowitz |
| 5,969,283 A | 10/1999 | Looney et al. |
| 5,977,964 A | 11/1999 | Williams |
| 5,983,176 A | 11/1999 | Hoffert |
| 5,987,525 A | 11/1999 | Roberts |
| 5,996,015 A | 11/1999 | Day |
| 6,000,008 A | 12/1999 | Simcoe |
| 6,009,382 A | 12/1999 | Martino et al. |
| 6,012,098 A | 1/2000 | Bayeh |
| 6,020,883 A | 2/2000 | Herz |
| 6,021,203 A | 2/2000 | Douceur |
| 6,026,398 A | 2/2000 | Brown |
| 6,026,439 A | 2/2000 | Chowdhury |
| 6,029,195 A | 2/2000 | Herz |
| 6,031,795 A | 2/2000 | Wehmeyer |
| 6,031,797 A | 2/2000 | Van Ryzin |
| 6,035,268 A | 3/2000 | Carus |
| 6,038,527 A | 3/2000 | Renz |
| 6,038,591 A | 3/2000 | Wolfe |
| 6,047,251 A | 4/2000 | Pon |
| 6,047,268 A | 4/2000 | Bartoli |
| 6,047,320 A | 4/2000 | Tezuka |
| 6,047,327 A | 4/2000 | Tso |
| 6,052,717 A | 4/2000 | Reynolds |
| 6,061,680 A | 5/2000 | Scherf |
| 6,064,980 A | 5/2000 | Jacobi et al. |
| 6,065,051 A | 5/2000 | Steele |
| 6,065,058 A | 5/2000 | Hailpern et al. |
| 6,070,185 A | 5/2000 | Anupam |
| 6,085,242 A | 7/2000 | Chandra |
| 6,097,719 A | 8/2000 | Benash |
| 6,102,406 A | 8/2000 | Miles |
| 6,105,022 A | 8/2000 | Takahashi |
| 6,131,082 A | 10/2000 | Hargrave, III et al. |
| 6,134,532 A | 10/2000 | Lazarus |
| 6,138,142 A | 10/2000 | Linsk |
| 6,154,773 A | 11/2000 | Roberts et al. |
| 6,161,132 A | 12/2000 | Roberts et al. |
| 6,161,139 A | 12/2000 | Win et al. |
| 6,167,369 A | 12/2000 | Schulze |
| 6,182,142 B1 | 1/2001 | Win |
| 6,185,560 B1 | 2/2001 | Young |
| 6,192,340 B1 | 2/2001 | Abecassis |
| 6,205,126 B1 | 3/2001 | Moon |
| 6,222,980 B1 | 4/2001 | Asai |
| 6,225,546 B1 | 5/2001 | Kraft |
| 6,230,192 B1 | 5/2001 | Roberts |
| 6,230,207 B1 | 5/2001 | Roberts |
| 6,240,459 B1 | 5/2001 | Roberts |
| 6,246,672 B1 | 6/2001 | Lumelsky |
| 6,249,810 B1 | 6/2001 | Kiraly |
| 6,252,988 B1 | 6/2001 | Ho |
| 6,263,313 B1 | 7/2001 | Milsted |
| 6,272,456 B1 | 8/2001 | de Campos |
| 6,272,495 B1 | 8/2001 | Hetherington |
| 6,282,548 B1 | 8/2001 | Burner |
| 6,292,795 B1 | 9/2001 | Peters et al. |
| 6,298,446 B1 | 10/2001 | Schreiber |
| 6,314,421 B1 | 11/2001 | Sharnoff |
| 6,317,761 B1 | 11/2001 | Landsman et al. |
| 6,321,205 B1 | 11/2001 | Eder |
| 6,321,221 B1 | 11/2001 | Bieganski |
| 6,330,593 B1 | 12/2001 | Roberts |
| 6,343,317 B1 | 1/2002 | Glorikian |
| 6,353,849 B1 | 3/2002 | Linsk |
| 6,370,315 B1 | 4/2002 | Mizuno |
| 6,370,513 B1 | 4/2002 | Kolawa |
| 6,389,467 B1 | 5/2002 | Eyal |
| 6,405,203 B1 | 6/2002 | Collart |
| 6,430,539 B1 | 8/2002 | Lazarus |
| 6,434,535 B1 | 8/2002 | Kupka |
| 6,438,579 B1 | 8/2002 | Hosken |
| 6,487,598 B1 | 11/2002 | Valencia |
| 6,490,553 B2 | 12/2002 | Van Thong |
| 6,505,203 B1 | 1/2003 | Levy |
| 6,512,763 B1 | 1/2003 | DeGolia, Jr. |
| 6,513,061 B1 | 1/2003 | Ebata et al. |
| 6,522,769 B1 | 2/2003 | Rhoads et al. |
| 6,526,411 B1 | 2/2003 | Ward |
| 6,532,477 B1 | 3/2003 | Tang |
| 6,535,854 B2 | 3/2003 | Buchner |
| 6,538,996 B1 | 3/2003 | West |
| 6,557,026 B1 | 4/2003 | Stephens, Jr. |
| 6,560,403 B1 | 5/2003 | Tanaka |
| 6,560,704 B2 | 5/2003 | Dieterman |
| 6,587,127 B1 | 7/2003 | Leeke |
| 6,611,812 B2 | 8/2003 | Hurtado |
| 6,611,813 B1 | 8/2003 | Bratton |

| | | |
|---|---|---|
| 6,614,914 B1 | 9/2003 | Rhoads |
| 6,615,208 B1 | 9/2003 | Behrens |
| 6,655,963 B1 | 12/2003 | Horvitz |
| 6,657,117 B2 | 12/2003 | Weare |
| 6,658,151 B2 | 12/2003 | Lee |
| 6,661,787 B1 | 12/2003 | O'Connell |
| 6,677,894 B2 | 1/2004 | Sheynblat |
| 6,725,446 B1 | 4/2004 | Hahn |
| 6,741,980 B1 | 5/2004 | Langseth |
| 6,757,740 B1 | 6/2004 | Parekh |
| 6,807,632 B1 | 10/2004 | Carpentier |
| 6,889,383 B1 | 5/2005 | Jarman |
| 6,925,441 B1 | 8/2005 | Jones, III |
| 6,952,523 B2 | 10/2005 | Tanaka |
| 2001/0005823 A1 | 6/2001 | Fischer |
| 2001/0042107 A1 | 11/2001 | Palm |
| 2001/0042109 A1 | 11/2001 | Bolas et al. |
| 2001/0044855 A1 | 11/2001 | Vermeire et al. |
| 2001/0052028 A1 | 12/2001 | Roberts |
| 2001/0055276 A1 | 12/2001 | Rogers |
| 2002/0002039 A1 | 1/2002 | Qureshey et al. |
| 2002/0004839 A1 | 1/2002 | Wine et al. |
| 2002/0007418 A1 | 1/2002 | Hedge et al. |
| 2002/0010621 A1 | 1/2002 | Bell et al. |
| 2002/0010714 A1 | 1/2002 | Hetherington |
| 2002/0010789 A1 | 1/2002 | Lord |
| 2002/0013852 A1 | 1/2002 | Janik |
| 2002/0016839 A1 | 2/2002 | Smith et al. |
| 2002/0035561 A1 | 3/2002 | Archer |
| 2002/0045717 A1 | 4/2002 | Grenda |
| 2002/0056004 A1 | 5/2002 | Smith |
| 2002/0065857 A1 | 5/2002 | Michalewicz |
| 2002/0082901 A1 | 6/2002 | Dunning |
| 2002/0095387 A1 | 7/2002 | Sosa |
| 2002/0099696 A1 | 7/2002 | Prince |
| 2002/0099737 A1 | 7/2002 | Porter |
| 2002/0111912 A1 | 8/2002 | Hunter |
| 2002/0129123 A1 | 9/2002 | Johnson |
| 2002/0152204 A1 | 10/2002 | Ortega et al. |
| 2002/0175941 A1 | 11/2002 | Hand |
| 2003/0002608 A1 | 1/2003 | Glenn |
| 2003/0007507 A1 | 1/2003 | Rajwan et al. |
| 2003/0028796 A1 | 2/2003 | Roberts |
| 2003/0046283 A1 | 3/2003 | Roberts |
| 2003/0083871 A1 | 5/2003 | Foote |
| 2003/0093476 A1* | 5/2003 | Syed .................... 709/204 |
| 2003/0133453 A1* | 7/2003 | Makishima et al. ..... 370/395.1 |
| 2003/0135513 A1 | 7/2003 | Quinn |
| 2003/0139989 A1 | 7/2003 | Churquina |
| 2003/0165200 A1* | 9/2003 | Pugel .................... 375/316 |
| 2003/0182139 A1 | 9/2003 | Harris |
| 2003/0190077 A1 | 10/2003 | Ross |
| 2003/0206558 A1* | 11/2003 | Parkkinen et al. .......... 370/477 |
| 2005/0149759 A1 | 7/2005 | Vishwanath |

FOREIGN PATENT DOCUMENTS

| | | |
|---|---|---|
| EP | 01/73639 | 5/1986 |
| EP | 0 847 156 A2 | 9/1997 |
| EP | 1010098 B1 | 4/1998 |
| EP | 1324567 A2 | 4/1998 |
| EP | 0955592 A2 | 4/1999 |
| EP | 1 033 880 | 9/2000 |
| EP | 1 050 833 A2 | 11/2000 |
| EP | 1236354 | 9/2002 |
| GB | 2304869 | 11/1995 |
| JP | 2001202368 | 7/2001 |
| JP | 2001521642 | 11/2001 |
| WO | WO 97/07467 | 2/1997 |
| WO | WO 98/25269 | 6/1998 |
| WO | WO 98/47080 | 10/1998 |
| WO | WO 99/27681 | 6/1999 |
| WO | WO 99/43111 | 8/1999 |
| WO | WO 00/46681 A1 | 2/2000 |
| WO | WO 00/31964 | 6/2000 |
| WO | WO 01/33379 A1 | 10/2000 |
| WO | WO 01/35667 A1 | 11/2000 |
| WO | WO 01/54323 A2 | 1/2001 |
| WO | WO 01/73639 A1 | 10/2001 |
| WO | WO 02/42862 A2 | 5/2002 |
| WO | WO 02/65341 | 8/2002 |
| WO | WO 03/012695 A2 | 2/2003 |

OTHER PUBLICATIONS

M.E. Maron and J.L. Kuhns, "On Relevance, Probabilistic Indexing and Information Retrieval," pp. 39-46, Found in: *Readings in Information Retrieval* Edited by Karen Spark Jones and Peter Willett, Morgan Kaufmann Publishers, Inc., San Francisco, CA, © 1997.

Cyril Cleverdon, "The Cranfield Tests On Index Language Devices," presented Apr. 27, 1967, pp. 47-59, Found in: *Readings in Information Retrieval*, Edited by Karen Sparck Jones and Peter Willett, Morgan Kaufmann Publishers, Inc., San Francisco, CA, © 1997.

G. Salton and M. E. Lesk, "Computer Evaluation Of Indexing and Text Processing," pp. 60-84, Found in: *Readings in Information Retrieval*, Edited by Karen Sparck Jones and Peter Willett, Morgan Kaufmann Publishers, Inc., San Francisco, CA, © 1997.

Chapter 3—"Key Concepts," pp. 85-92 Found in: *Readings in Information Retrieval*, Edited by Karen Sparck Jones and Peter Willett, Morgan Kaufmann Publishers, Inc., San Francisco, CA, © 1997.

W. J. Hutchins, "The Concept of 'Aboutness' in Subject Indexing," presented Apr. 18, 1977, Chapter 3—Key Concepts, pp. 93-97, Found in: *Readings in Information Retrieval*, Edited by Karen Sparck Jones and Peter Willett, Morgan Kaufmann Publishers, Inc., San Francisco, CA, © 1997.

Cyril W. Cleverdon and J. Mills, "The Testing Of Index Language Devices," presented Feb. 5, 1963, Chapter 3—Key Concepts, pp. 98-110, Found in: *Readings in Information Retrieval*, Edited by Karen Sparck Jones and Peter Willett, Morgan Kaufmann Publishers, Inc., San Francisco, CA, © 1997.

Gerard Salton and Michael J. McGill, "Introduction to Modern Information Retrieval," Computer Science Series, pp. 1-435, © 1983 by McGraw-Hill, Inc., McGraw-Hill Book Company, USA.

C. J. van Rijsbergen B.Sc., Ph.D., M.B.C.S, "Information Retrieval," Department of Computing Science—University of Glasgow [online], 1979 [retrieved on Aug. 24, 2001] Retrieved from <URL:http://www.dcs.gla.ac.uk/keith/preface.html> (213 pages).

Alan Griffiths, H. Claire Luckhurst and Peter Willett, "Using Interdocument Similarity Information in Document Retrieval Systems," pp. 365-373, © 1986 by John Wiley & Sons, Inc.

Karen Sparck Jones, "Search Term Relevance Weighting Given Little Relevance Information," pp. 329-338, (originally located in Journal of Documentation, vol. 35, No. 1, Mar. 1979, pp. 30-48).

E. Michael Keen, "Presenting Results of Experimental Retrieval Comparisons," Department of Information & Library Studies, University College of Wales, Aberystwyth, Sy23 U.K., pp. 217-222.

Brian P. Mc Cune, Richard M. Tong, Jeffrey S. Dean, and Daniel G. Shapiro, "RUBRIC: A System for Rule-Based Inforamtion Retrieval," pp. 440-445.

S.E. Robertson, "The Probability Ranking Principles In 1R," School of Library, Archive, Information Studies, University College of London, pp. 281-286.

S.E. Robertson and S. Walker, "Some Simple Effective Approximations to the 2—Poisson Model for Probabilistic Weighted Retrieval," Centre for Interactive Systems Research, Department of Information Science, City University, Northampton Square, London, EC1V 0HB, U.K., pp. 345-354.

G. Salton and M.J. McGill, "The SMART and SIRE Experimental Retrieval Systems," pp. 381-399.

G. Salton, A. Wong and C.S. Yang, "A Vector Space Model for Automatic Indexing," Cornell University, pp. 273-280.

Gerard Salton and Christopher Buckley, "Term-Weighting Approaches In Automatic Text Retrieval," (received Nov. 19, 1987;

accepted in final form Jan. 26, 1988), Department of Computer Science, Cornell University, Ithaca, NY.

Tomek Strzalkowski, "Robust Text Processing in Automated Information Retrieval," Courant Institute of Mathematical Sciences, pp. 317-322.

Jean Tague-Sutcliffe, "The Pragmatics of Information Retrieval Experimentation Revisited," School of Library and Information Science, University of Western Ontario, Canada, pp. 205-216.

M. F. Porter, "An Algorithm For Suffix Stripping," Computer Laboratory, Corn Exchange Street, Cambridge, 313-316.

W. B. Croft and D. J. Harper, "Using Probabilistic Models of Document Retrieval Without Relevance Information," Department of Computer & Information Science, University of Massachusetts, pp. 339-344.

Hayes, Conor et al., Smart Radio—A Proposal, Technical Report TCD-CS-1999-24, Online! Apr. 1999, pp. 1-14, XP002279579, Trinity College Dublin, Ireland, Retrieved from the Internet: <URL:http://www.cs.tcd.ie/publications/tech-reports/reports.99/TCD-CS-1999-24.pdf>, retrieved on May 7, 2004.

Hoffman, Thomas et al., Latent Class Models For Collaborative Filtering, Proceedings Of The Sixteenth International Joint Conference On Artificial Intelligence, IJCAI 99, Stockholm, Sweden, Jul. 31-Aug. 6, 1999, Online! pp. 688-693, XP002279578, Retrieved from the Internet: <URL:http://www.cs.brown.edu/{th/papers/HofmannPuzicha-IJCAI99.pdf>, retrieved on May 7, 2004.

Loeb, Shoshana, Architecting Personalized Delivery Of Multimedia Information, Communications Of The ACM, vol. 25, No. 12, Dec. 1992, pp. 39-50, XP002102709.

Nichols, David M. et al., Recommendation And Usage In The Digital Library, Technical Report Ref. CSEG/2/1997, Online! 1997, pp. 1-15, XP002279577, Retrieved from the Internet: <URL:ftp://ftp.comp.lancs.ac.uk/pub/reports/1997/CSEG.2.97.pdf>, retrieved on May 7, 2004.

Schafer, J. Ben et al., Recommender Systems in E-Commerce, Proceedings ACM Conference On Electronic Commerce, 1999, pp. 158-166, XP002199598.

Supplementary European Search Report, issued in connection with European Application No. 02803194.6.

U.S. Appl. No. 60/144,377, filed Jul. 16, 1999, Benjamin E. Hosken.

U.S. Appl. No. 60/165,726, filed Nov. 15, 1999, Sean Michnel Ward.

U.S. Appl. No. 60/165,727, filed Nov. 15, 1999, Sean Michnel Ward.

U.S. Appl. No. 60/166,039, filed Nov. 17, 1999, Sean Michnel Ward.

Adam B. Stubblefield, et al., "A Security Analysis of My.PP3.com and the Beam-it Protocol".

Carl de Marcken, "The Unsupervised Acquisition of a Lexicon from Continuous Speech," Massachusetts Institute of Technology Artificial Intelligence Laboratory: Center for Biological and Computational Learning, Department of Brain and Cognitive Sciences, A.I. Memo No. 1558 and C.B.C.L. Memo No. 129, Nov. 2001, pp. 1-27.

Charu C. Aggarwal, Cecilia Procopiuc, Joel L. Wolf, Philip S. Yu, and Jong Soo Park, "Fast Algorithm for Projected Clustering;", Proceedings of the ACM SIGMOD International Conference on Management of Data, 1999.

David A. Hull and Gregory Grefenstette, "Querying Across Languages: A Dictionary-Based Approach to Multilingual Information Retrieval," pp. 484-492.

Erling Wold, Thom Blum, Douglas Keislar, and James Wheaton, "Content-Based Classification, Search, and Retrieval of Audio," IEEE MultiMedia, Fall 1996.

F.W. Lancaster, "MEDLARS: Report on the Evaluation of Its Operating Efficiency," pp. 223-246.

Gerard Salton, James Allan, Chris Buckley and Amit Singhal, "Automatic Analysis, Theme Generation, and Summarization of Machine-Readable Texts," pp. 478-483.

Ian Goldberg, Steven D. Gribble, David Wagner, Eric A. Brewer "The Ninja Jukebox" Oct. 14, 1999.

Ian H. Witten and Eibe Frank, "Data Mining, Practical Machine Learning Tools and Techniques with JAVA Implementations", Academic Press, pp. 57-76.

Internet Papers: Freetantrum: Songprint 1.2, and computer code; www.freetantrum.org.

Karen Sparck Jones, G.J.F. Jones, J.T. Foote, and S.J. Young, "Experiments in Spoken Document Retrieval," pp. 493-502.

Lisa F. Rau, "Conceptual Information Extraction and Retrieval from Natural Language Input," Artificial Intelligence Program GE Research and Development Center, Schenectady, NY 12301, pp. 527-533.

M. Agosti, G. Gradenigo, P.G. Marchetti, "A Hypertext Environment for Interacting with Large Textual Databases," pp. 469-477.

MusicMatch Literature downloaded from web.archive.org—7 pages total.

N.J. Belkin, R.N. Oddy, H.M. Brooks, "The Journal of Documentation", pp. 299-304, vol. 38, No. 2, Jun. 1982.

RealNetworks Literature downloaded from web.archive.org—16 pages total.

R. Brody, Ph.D., "The Conditions and Consequences of Profiling in Commercial and Governmental Settings," Technology And Society, 1998. ISTAS 98. Wiring The World: The Impact Of Information Technology On Society, Proceedings of the 1998 International Symposium on South Bend, IN, USA Jun. 12-13, 1998, NY, NY, USA, IEEE, US, Jun. 12, 1998, pp. 148-154, XP010291443, ISBN: 0-7803-4327-1 *the whole document*.

Tej Shah, "Improving Electronic Commerce Through Gathering Customer Data", TCC402 [online] Apr. 23, 1998 XP002379874, University of Virginia, USA, Retrieved from the Internet: <URL:http://www.lib.virginia.edu> [Retrieved on May 8, 2006] *the whole document*.

Unjung Nam, Lectures: "Mel-Frequency Cepstral Analysis," [online] [retrieved on Feb. 2, 2001] Retrieved from the Internet <URL:http://www.ccrma.standford.edu/~unjung/mylec/mfcc.html>, pp. 1-3.

Z. Liu, et al., "Audio Feature Extraction and Analysis for Scene Segmentation and Classification".

* cited by examiner

SYSTEM FOR CONTROLLING AND ENFORCING PLAYBACK RESTRICTIONS FOR A MEDIA FILE BY SPLITTING THE MEDIA FILE INTO USABLE AND UNUSABLE PORTIONS FOR PLAYBACK

CROSS-REFERENCE TO RELATED APPLICATION

This application is a continuation of U.S. patent application Ser. No. 10/291,210, filed on Nov. 8, 2002 now U.S. Pat. No. 7,024,485, the disclosure of which is incorporated by reference, and which claimed priority from U.S. patent application Ser. No. 09/846,823, filed on Apr. 30, 2001, pending, the disclosure of which is incorporated by reference, and which claimed priority from U.S. Provisional Application Ser. No. 60/201,622, filed May 3, 2000, the disclosure of which is incorporated by reference. The present application also claims priority from U.S. patent application Ser. No. 10/291,210, filed on Nov. 8, 2002, and which claims priority from provisional U.S. patent application Ser. No. 60/337,939, for "File Splitting, Scalable Coding, and Asynchronous Transmission in Streamed Data Transfer," filed Nov. 9, 2001, the disclosure of which is incorporated by reference.

BACKGROUND OF THE INVENTION

1. Field of the Invention

The present invention is related to delivery of streamed programs such as audio and video, and more particularly to systems and methods providing improved control, efficiency, and quality of such streamed transmissions using file splitting, scalable coding, and asynchronous transmission.

2. Description of the Background Art

Delivery of audio and video programs over the Internet provides several advantages over conventional broadcast media such as radio and television. Unlike broadcast media, which require users to receive programs at particular times, or to record them for later use, Internet delivery allows users to select and receive programs upon demand, at a time that is convenient to them. For example, a user may browse to a news story, presented in text format, and click on a link that initiates playback of an audio report on the news item. Users may also click on links to hear songs or song samples, as is common in ecommerce sites, such as amazon.com or cdnow.com, in order to permit users to sample songs before purchasing compact discs (CDs). Internet delivery of audio programming may also be used for implementing personalized radio stations, which deliver music tracks selected in response to the tastes of particular users. Similar functionality is available for the delivery of video programs on demand, allowing users to view sports highlights, news reports, music videos, and even films and television shows, over the Internet.

Software for playing back such audio and video files is known in the art, including for example the Windows Media Player from Microsoft Corporation, and the RealPlayer from Real Networks, Inc. Functionality for audio and video delivery may also be built into browsers such as Netscape Navigator and Microsoft Internet Explorer.

One disadvantage of Internet delivery of audio and video programs is the relatively limited bandwidth that is available for any particular program. Compared with broadcast media, such as radio, television (over-the-air or cable), and the like, typical Internet connections offer far less bandwidth and thus limit the amount of information that may be transmitted to the end user in a given period of time. Thus, even with the application of aggressive compression algorithms, sound quality and picture quality of streamed programs received over the Internet tend to be substandard. For example, due to the limited number of bits available, existing Internet delivery schemes fail to provide received audio programs at a quality approaching that of CDs.

As an alternative to streamed programs, and in order to improve quality of the received programs, users may download programs and then, subsequent to downloading them, play the received program via their computers. Since the program is not being viewed or listened to in "real time," more time is available to transmit and receive the program, so that larger files may be provided, and better quality achieved. However, it may take many minutes, or even hours, to download a short program at a reasonable level of quality. Thus, such a scheme does not provide the user with an immediate listening or viewing experience; rather, the user must wait until the program is downloaded before it can be viewed or listened to.

SUMMARY OF THE INVENTION

The present invention provides improved quality, security, and efficiency for streamed programs, by combining received streamed data with previously-stored (cached) data. In one embodiment, a program file containing program data such as audio, video, or the like, is split into two or more sections. In one embodiment, each section is not usable on its own to provide program output (e.g., audio signals where the program file is an audio file), but can only be used when recombined with the remaining sections. In one embodiment, one section of the split data is considerably smaller than the other section(s). This splitting allows the second section to be cached by a client machine without a danger that the client has a persistent usable copy of the original file. This allows the benefits of caching to be realized without providing users with unauthorized persistent copies of files.

For example, the second section may be transmitted in advance of the actual playback of a program file, thus avoiding bottlenecks that may result when the entire program file is transmitted upon user demand. Until the first section is transmitted, the user will not be able to play the program file. The smaller first section may be streamed to allow playback of the program file. The first section is discarded after playback so that no persistent usable copy of the program file remains on the user's machine. The second section remains cached, allowing future streaming playback to be performed efficiently. The ability to not provide a persistent usable copy of the program file can be advantageous because copyright holders may not wish to authorize such persistent copies, since the persistent copy could cannibalize revenues from sales of the program file in a tangible medium (such as audio CDs), or paid future downloads, streamed or otherwise, of the program file.

Alternatively, the program file is split into sections in order to provide scalability in the playback quality level. The first section is playable at a relatively low quality level. Additional sections of data may be added to the first section to increase the quality level. Thus, the program file may be downloaded and played at a quality level determined by the bandwidth of the connection. The sections may be cached so that when it is desired to play the program file again, additional sections may be downloaded and added for higher quality playback.

In some embodiments, a persistent copy of a playable version of the program file is not stored on the client. The additional sections are not playable without the first level. Thus, the additional sections may be cached, so that the file can be played back by combining a downloaded first section with cached additional sections.

The file splitting and scalable coding embodiments may also both be used on the same program file. This allows most of the file to be cached while still providing the server control over when the file may be played back. It also allows subsequent playbacks of the file after the first to be progressively higher quality as more of the scalable sections are transmitted with every playback.

DETAILED DESCRIPTION OF THE PREFERRED EMBODIMENTS

The following description of preferred embodiments of the present invention is presented in the context of an Internet-based jukebox or personalized radio station where it is desirable to stream music files. One skilled in the art will recognize that the present invention may be implemented in many other domains and environments, both within the context of musical files, and in other contexts. Accordingly, the following description, while intended to be illustrative of a particular implementation, is not intended to limit the scope of the present invention or its applicability to other domains and environments. Rather, the scope of the present invention is limited and defined solely by the claims.

Architecture Overview

Figure 2:
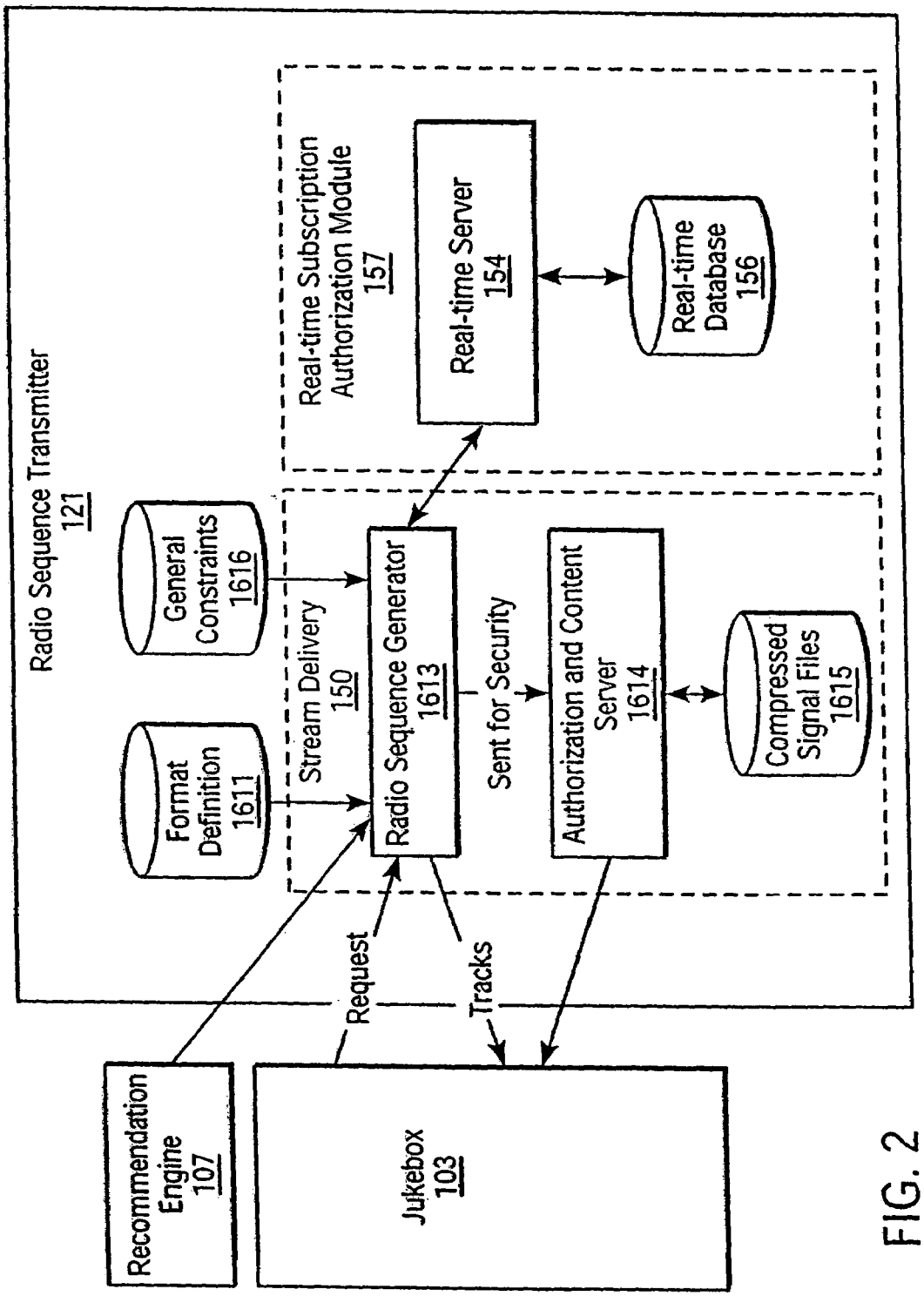
FIG. 2 is a block diagram of a conceptual architecture for one embodiment.

Referring now to FIG. 2, there is shown a conceptual architecture of one embodiment of the present invention. In the architecture of FIG. 2, the invention is implemented in connection with a web-based "jukebox" 103, or personalized radio station.

Stream delivery system 150 interacts with jukebox 103 to specify a sequence of audio files to deliver to jukebox 103. In some embodiments, this jukebox 103 may run on a client such as a personal computer, while the stream deliver server system is part of a remote server, connected to the client via a network. Jukebox 103 transmits requests to stream delivery system 150, and stream delivery system 150 delivers the audio files, as tracks, to jukebox 103. Stream delivery system 150 also communicates with real-time subscription authorization module 157, which includes real-time server 154 and database 156 that keep track of which user accounts are active and enforces global business rules about which accounts can listen to the radio at a given time. Within stream delivery system 150, there are a number of distinct software entities. Radio sequence generator 1613 receives requests from jukebox 103, receives format definitions 1611 and general constraints 1616 and receives recommendations from recommendation engine 107, to generate track selections to be transmitted to jukebox 103. The track selections generated by radio sequence generator 1613 specify which files to play according to estimated listener preferences as well as pre-determined station formats. Authorization and content server 1614 keeps a record of the files that are selected by radio sequence generator 1613; server 1614 is consulted by radio sequence generator 1613 when files are requested. If generator 1613 does not provide the necessary security information, server 1614 flags this anomaly and declines to provide the data.

Figure 1A:
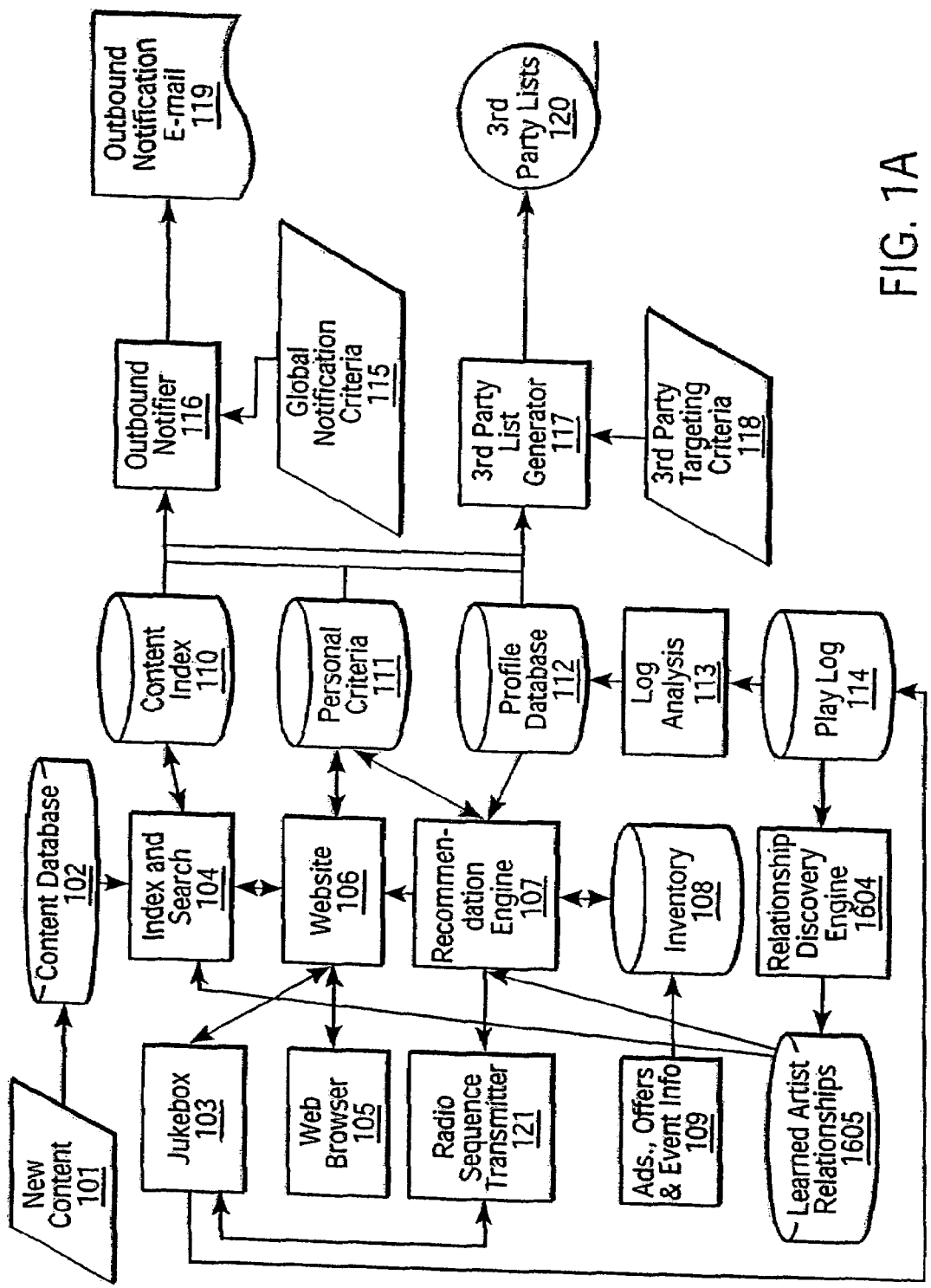
FIG. 1A is a block diagram of a functional architecture.

Referring now to FIG. 1A, there is shown a block diagram of a functional architecture for one embodiment of the present invention. Content index 110 provides a concise index of content stored in database 102, and is generated by conventional index generation means, to enable more efficient searching and updating of database 102.

Stream Delivery

In one embodiment, program files, such as audio files, are delivered to users as streamed data. The relationship discovery engine described in U.S. patent application Ser. No. 09/846,823, filed on Apr. 30, 2001, pending describes one way to implement a personalized radio station, which may be used in conjunction with the present invention. The radio sequence transmitter 121 may deliver units of data to jukebox 103 in a format wherein each unit encodes a period of music. Since radio stations typically repeat their programming several times, it is beneficial to cache the data units in order to reduce the amount of transmitted data. In addition, if a sufficiently large time scale is used, different channels of the radio station may have considerable overlap among currently playing selections that are being delivered to various users. By identifying these common units, transmitter 121 can take advantage of further economies of transmission, so as to provide more efficient delivery of audio data.

In one embodiment, the transmitter 121 employs file splitting to improve the streaming performance, and provide streaming performance even in situations where channel capacity would otherwise be insufficient to provide the desired level of quality. In some embodiments, files are split prior to being stored in the content database 102 or with the compressed signal files 1615. In other embodiments, the files 101 are stored in the content database 102 or with the compressed signal files 1615 without first being split; the files are then split prior to being transmitted to a user for playback.

Figure 3A:
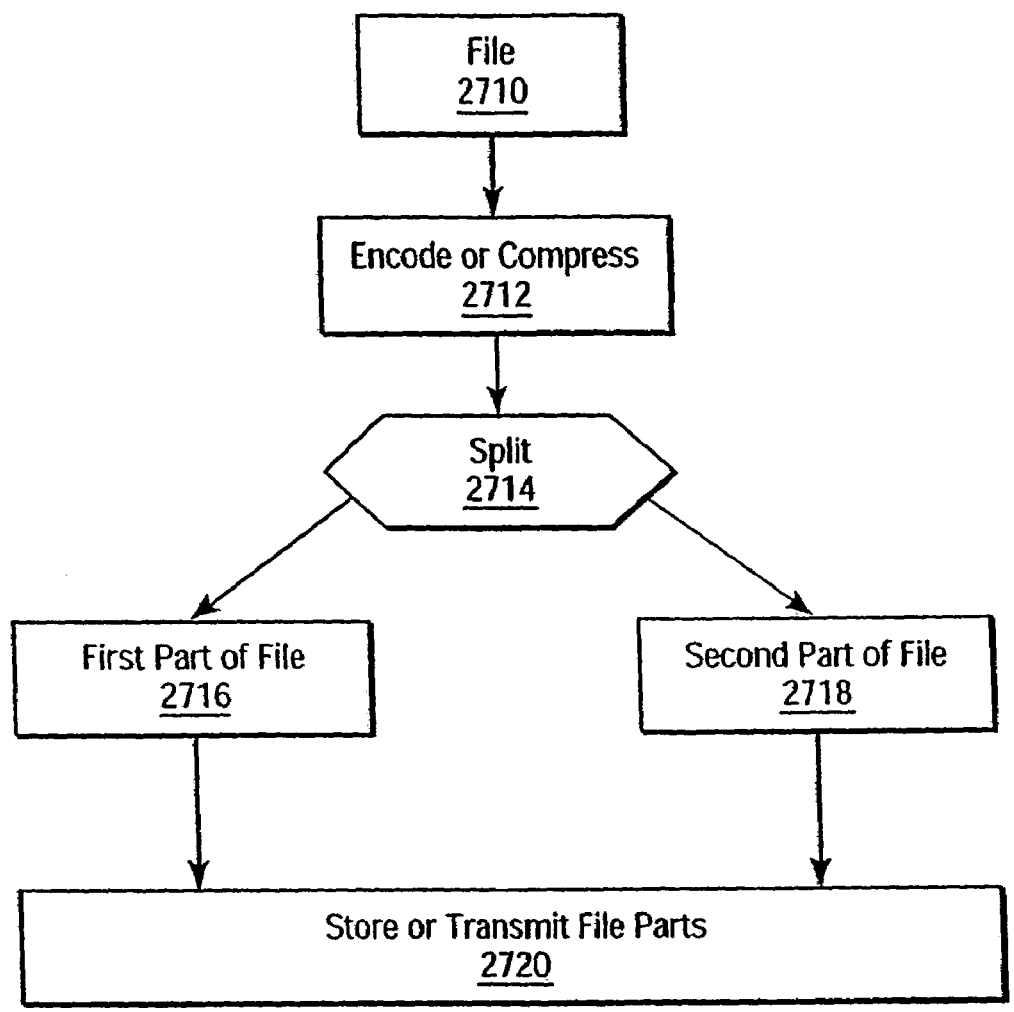
FIGS. 3A and 3B illustrate a method for splitting a program file according to one embodiment of the present invention.

FIG. 3A is a flow diagram illustrating a method of splitting and storing a program file (such as a bitstream) containing program data such as audio, video, or the like, according to one embodiment. The process begins with the unsplit file 2710. Prior to being split, the file 2710 may be encoded and/or compressed 2712, although such operations are not essential to the present invention. Next the file 2710 is split 2714 into two or more parts, resulting in at least a first part 2716 of the file and a second part 2718 of the file. Particular techniques for splitting 2714 file 2710 are described in more detail in connection with FIG. 3B below. In one embodiment, the second part 2718 is substantially larger than the first part 2716. The file may be split 2714 into more than two parts. The parts 2716 and 2718 of the file 2710 are then stored 2720 in the content database 102 or with the compressed signal files 1615, or in some other location for later transmission. Alternatively, in an embodiment wherein files are split 2714 immediately prior to being transmitted, parts 2716 and 2718 are transmitted 2720 to an end user or remote computer for playback.

Figure 3B:
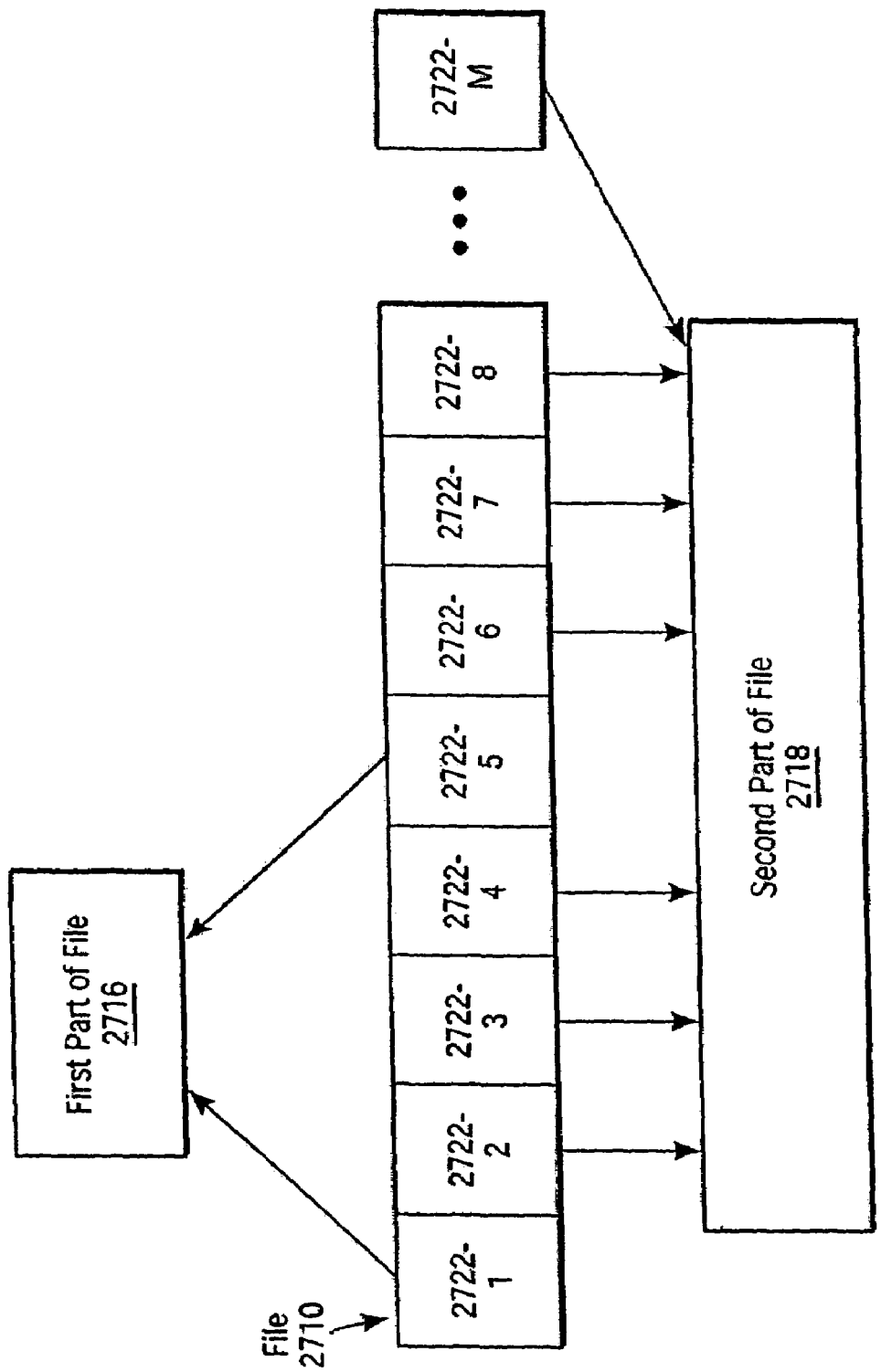

FIG. 3B is a block diagram illustrating an example of a method of splitting 2714 file 2710 into parts 2716, 2718 according to one embodiment. In the illustrated example, the file 2710 has M bits 2722-1 through 2722-M. The system generates first part 2716 of the file 2710 by taking N out of every P bits. The system generates second part 2718 of the file by taking the remaining P-N out of every P bits. In FIG. 3B, N is equal to one, and P is equal to four. Thus, the system assigns first bit 2722-1 to first part 2716, and assigns the next three bits 2722-2 through 2722-4 to second part 2718. The system then assigns fifth bit 2722-5 to first part 2716 and the next three bits 2722-6 through 2722-8 to second part 2718. The system repeats this pattern until all the bits of the file 2710 have been assigned to one of first and second parts 2716, 2718. In short, then, the system divides file 2710 into sections, with the first bit (or some other bit) of each section being sent to the first part 2716, and the remaining bits of each section being sent to the second part 2718. In general, the splitting technique of the present invention results in two or more sections 2716, 2718 each of which cannot be played back on its own, but can be played only when recombined with the other section or sections.

In one embodiment, N is equal to one, and P is equal to twenty, so that the first part 2716 is approximately 5% the size of the original file 2710, and the second part 2718 is approximately 95% the size of the original file 2710.

One skilled in the art will recognize that the system of the invention is not limited to file-splitting by bits, but may split files according to other units, such as bytes, or simply an arbitrary unit size. Alternatively, other file-splitting techniques may be used. For example, the system can include all headers, compression table selectors and scale factors into the first section 2716, and include all encoded program data (such as audio or video) into the second part 2718. Other methods of splitting the file 2710 into two or more parts may also be used.

In general, it is desirable in most embodiments that each part of the file 2710 is not decodable or able to be played back on its own, but can only be decoded and/or played back when recombined with the remaining part(s). This allows a part to be handled, transmitted, cached, or otherwise processed, without concerns that a user may permanently store and reuse an unauthorized copy of the program. Since a part cannot be used independently to recreate a recognizable facsimile of the signal in the original file 2710, the part can be cached by a client machine without any danger that the client has been given an unauthorized, useable persistent copy of the program file 2710. The ability to not provide a persistent usable copy of the program file can be advantageous because copyright holders may not wish to authorize such persistent copies, since the persistent copy could cannibalize revenues from sales of the program file in a tangible medium (such as audio CDs), or paid future downloads, streamed or otherwise, of the program file.

Figure 3C:
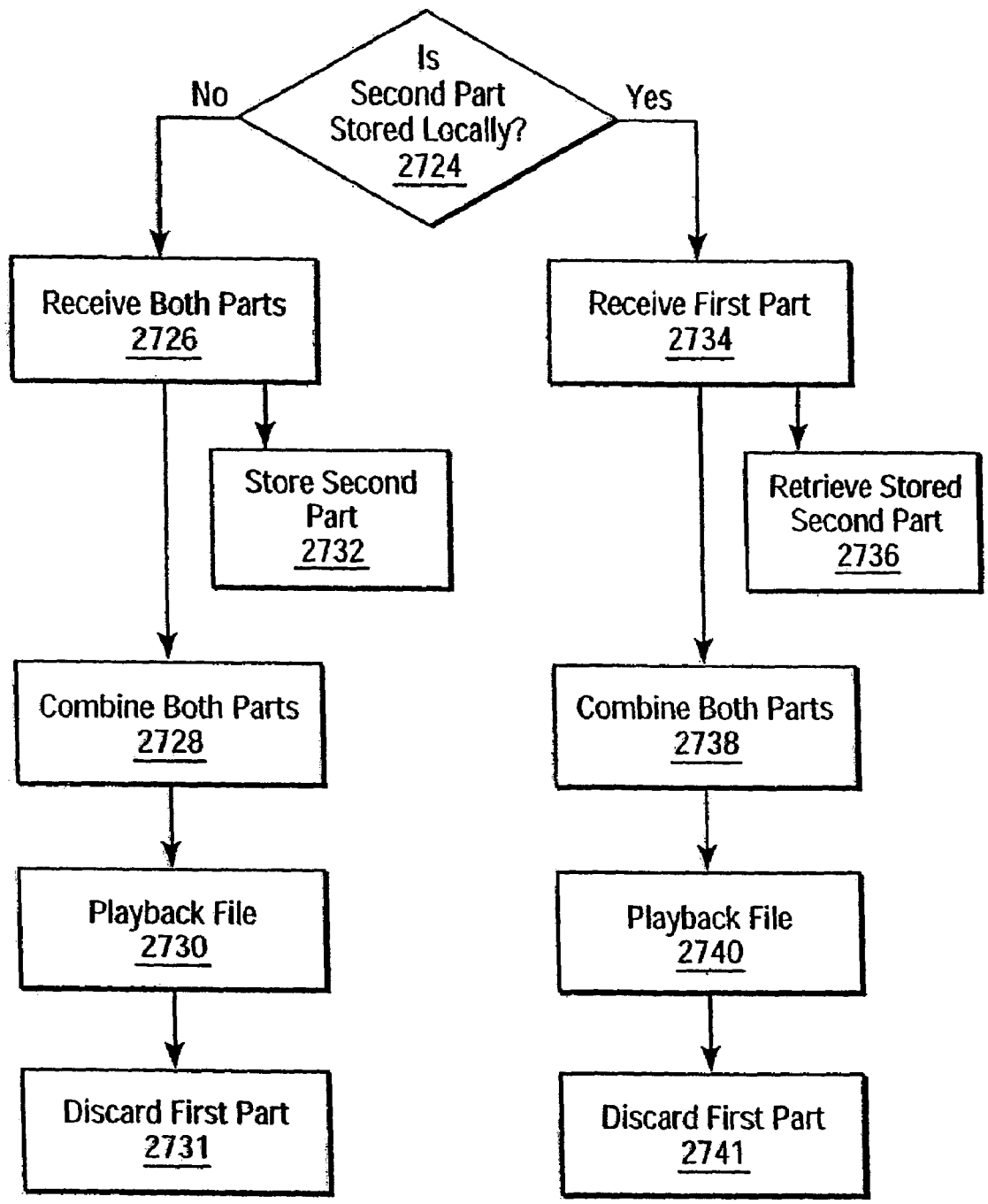
FIGS. 3C and 3D illustrate a method of receiving and playing a previously split program file according to one embodiment of the present invention.

FIG. 3C is a flow diagram illustrating a method of receiving and playing a previously split program file according to one embodiment of the present invention. When a file is to be transmitted from stream delivery system 150 to the jukebox 103, the jukebox 103 or server 1614 determines 2724 whether the second part 2718 of the file 2710 has previously been stored, or cached, locally and is available for retrieval. If the second part 2718 is not available locally for retrieval, jukebox 103 requests transmission of both parts 2716, 2718 of the file 2710. In response, server 1614 retrieves the requested parts 2716, 2718 from the files 1615 or the content database 102 (depending on where the parts 2716, 2718 have been stored), and transmits both the parts 2716, 2718 of the file 2710 to the jukebox 103, which receives 2726 them. Alternatively, if the files 2710 are stored unsplit, server 1614 retrieves the file 2710 to be sent, splits the requested file according to techniques described above, and then transmits the parts 2716, 2718 to the jukebox 103, which receives 2726 them.

Upon receiving 2726 parts 2716, 2718, in one embodiment the jukebox 103 stores 2732 the second part 2718 locally, so as to avoid the need to retransmit the second part 2718 if it is needed in the future. The jukebox 103 combines 2728 both parts 2716, 2718, and plays back 2730 the recombined program file 2710. This reception 2726, combination 2728, and playback 2730 may all take place concurrently, for example according to a streamed transmission methodology. In one embodiment, as the bits arrive at the jukebox 103, they are combined 2728 and played back 2730; the jukebox 103 need not wait until the entirety of the parts 2716, 2718 are received 2726 before combining 2728 and playing them back 2730. In one embodiment, the recombined file 2710 and the first part 2716 are discarded 2731 after or during playback. Since the cached second part 2718 represents only a portion of the program file 2710 and in one embodiment cannot be decoded or played back on its own, the invention prevents users from retaining an unauthorized playable copy of the program file 2710. Ultimate control over the user's playback of the program file 2710 thus remains with the server 1614, since the stored second part 2718 cannot be used to play back of the file 2710 until the server 1614 retransmits the first part 2716.

If the second part 2718 has been received and stored locally in a prior session, jukebox 103 requests transmission of only the first part 2716 of the file 2710. In response, server 1614 retrieves the requested first part 2716 from the files 1615 or the content database 102, and transmits the first part 2716 to the jukebox 103, which receives 2734 it. Alternatively, if the files 2710 are stored unsplit, server 1614 retrieves the file 2710 to be sent, splits the requested file according to techniques described above, and then transmits the first part 2716 of the file 2710 to the jukebox 103, which receives 2734 it. The jukebox 103 retrieves 2736 the second part 2718 from local storage and combines 2738 the first and second parts 2716, 2718 to reconstruct the file 2710. The jukebox 103 plays back 2740 the reconstructed program file 2710. In one embodiment, as the bits arrive at the jukebox 103, they are combined 2738 with the stored second part 2718 to form a representation of the program file and played back 2740; the jukebox 103 need not wait until the entirety of the first part 2716 is received 2734 before combining and playing back the program. In other words, playback 2740 may take place while the first part 2716 is being streamed. As described above, in one embodiment, the recombined file 2710 and the first part 2716 are discarded 2731 after or during playback.

As can be seen from the description above, it is not necessary to transmit the second part 2718 more than once. The second part 2718 can be stored locally after the first transmission, so that, in one embodiment, only the first part 2716 need be transmitted for subsequent streaming playback of the program file 2710. Since in some embodiments the stored second part 2718 is substantially larger than the first part 2716, the present invention greatly reduces bandwidth requirements for streaming playback of the program file 2710. After the second part has been stored locally 2732, even clients with slow connections may effectively stream the program file 2710. Thus, from the user's perspective, the program file 2710 appears to be streamed in a manner equivalent to conventional streaming.

In addition, the described file splitting may provide advantages in licensing distribution of programs for playback by users. The file splitting benefits the licensor because the user does not receive a persistent usable copy of the program file, and the server retains control of playback of the program file 2710. This is advantageous because in contexts where blanket licensing or compulsory licensing is available for providing streamed data, in audio programming for example, a persistent copy would cannibalize revenues from future licensed streamed data downloads, and lack of control would make collecting licensing revenues difficult. The file splitting benefits users who do not want to wait while a large file is transmitted and received before accessing the program file. By splitting the file and storing part locally, transmission of large and unwieldy amounts of data in real-time is unnecessary. The user has quick access to the program file, even if he or she is using a slow communication channel.

The present invention thus improves efficiency in the transmission of program files such as audio or video files, and helps avoids bottlenecks associated with conventional streaming techniques, while still providing control and security.

Figure 3D:
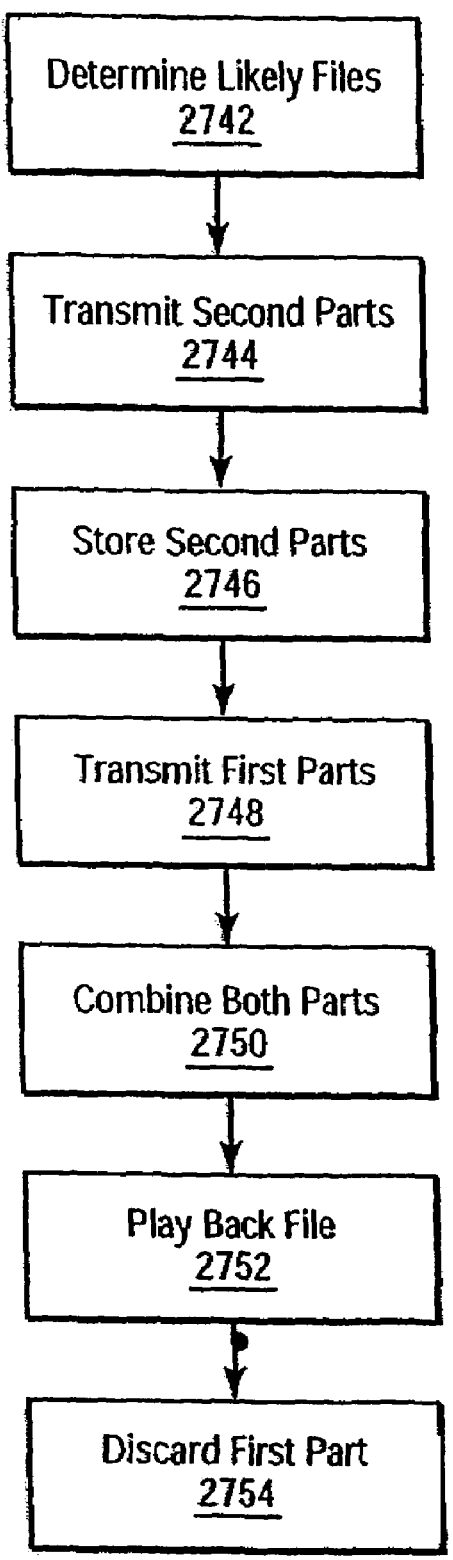

FIG. 3D is a flow diagram illustrating a method of receiving and playing a previously split program file according to one embodiment of the present invention, so as to provide improved streaming performance from a user's perspective, even if adequate bandwidth to stream the entire file 2710 is not available, through advance downloading of the second section 2718. For example, the second section 2718 may be transmitted in advance of the actual playback of an audio or video program in a first session, thus avoiding potential bottlenecks that may result when the entire program file 2710 is transmitted upon user demand according to streamed techniques. Advance transmission can be performed at off-peak times, thus avoiding bandwidth bottlenecks. This advance transmission can occur when the user is not actually listening to music, so as to facilitate improved usage of an otherwise idle network connection.

The jukebox 103 determines 2742 which program files are likely to be requested by a user, so that at idle times it can transfer data that is likely to be useful in the future. Such determination may be made, for example, by using the learned artist relationships described in U.S. patent application Ser. No. 09/846,823, filed on Apr. 30, 2001, pending, in order to "guess" which tracks the user is most likely to request in the future. Alternative methods of determination may also be used. In some embodiments, the files the user will likely want may be known, such as when the user listens to a personalized radio station, or tends to listen to a particular online radio station. Such radio stations often have a list of the files that will be streamed later. Thus, this list can be used to determine 2742 what files will be required.

After the jukebox 103 determines 2742 what files will likely be required, the jukebox 103 requests the second parts 2718 of the files at a time when the connection is idle, or when sufficient bandwidth exists to transmit files. The authorization and content server 1614 then transmits 2744 the requested second parts 2718 to the jukebox 103. The jukebox 103 locally stores 2746 the second parts 2718 to the files. At a later time, when a user requests that a program file 2710 be streamed, the jukebox 103 requests the first part 2716 of the program file 2710, as described above. In response, authorization and content server 1614 transmits 2748 the first part 2716. The jukebox 103 combines 2750 the received first part 2716 with the stored second part 2718 to form a representation of the file 2710 and plays back 2752 the representation of the file 2710. Such a technique permits higher-quality playback than would otherwise be available, by pre-transmitting a significant portion of the data needed for playing back the media program. As described above, in one embodiment, the recombined file 2710 and the first part 2716 are discarded 2754 after or during playback.

In one alternative embodiment, instead of transmitting 2744 the second parts 2718 over a network, the second parts 2718 may be stored on physical media (such as a compact disc or floppy disk). That physical media is then physically sent to the location of the jukebox 103, where it can act as a local storage device, or the second parts 2718 may be transferred from the physical media to desired local storage. Thus, even for slow network connections, or for very large files, the user may enjoy a streaming experience, while the server retains control of the program file.

In another embodiment, the file is further split according to circumstances surrounding its transmission. The stream delivery system 150 begins to transmit all or part of the program file, such as an audio file, to the jukebox 103. When the program file, or part of the program file is partially transmitted, transmission is stopped. This stop can occur because of a disconnection between the stream delivery system 150 and the jukebox 103, because a user wishes to stop transmission and use the bandwidth for other purposes (such as when skipping to the next streamed song in a personalized radio station), or other reasons. The partially transmitted section of the program file or part of the program file is stored locally. Then, at a later time, the rest of the program file or part of the program file is transmitted and combined with the stored part. Such a process is more efficient than starting to transmit the entire program file or part of the program file from the beginning if it was not completely transmitted in a prior session.

In one embodiment, the size of the transmitted information is used to determine whether the entire file or section has been transmitted, and if not, what further information must be transmitted. At the beginning of transmission, the stream delivery system 150 sends information to the jukebox 103 indicating the size of the file and parts to be transmitted. This information may be sent to the jukebox 103 in other ways as well, as part of a sequence listing, for example. The jukebox 103 can then use the received size of the file in conjunction with the stored file size to determine what remaining information is needed from the stream delivery system 150. Other methods to identify what further information is needed to complete a partially received file may also be used.

For example, one embodiment splits a 1000 byte audio file into two parts, a first section 2716 of 50 bytes, and a second section 2718 of 950 bytes. The stream delivery system 150 transmits 800 bytes of the second section 2718 to the jukebox 103. At this point, a user chooses to start transmission of another audio file, and end transmission of the first audio file. The transmitted 800 bytes of the second section 2718 are stored locally. Thus, to allow the user to listen to the first audio file in its entirety, only the remaining 150 bytes of the second part 2718 need be transmitted to the jukebox. This subsequent transmission of the remaining 150 bytes may be done as needed, such as when a user begins to listen to the audio file again and the first 800 bytes are taken from local storage, then the last 150 bytes are received from the stream delivery system. This transmission can also be performed in advance of the time the user wishes to listen to the audio file, such as a scheme where the jukebox 103 periodically checks for partial file sections, such as partial second parts 2718, and automatically request transmission of the rest of the second part 2718. The jukebox 103 may identify partial file sections by comparing the total file size to the stored size, and then requesting only the missing information, or through other methods.

In another alternative embodiment, instead of discarding the first part 2716, the jukebox 103 encrypts the first part 2716 and stores the first part 2716 locally. This further reduces the amount of data that must be transmitted for program file 2710 playback. The server 1614 may still retain control over playback of the program file 2710 by controlling when the jukebox 103 may decrypt the first part 2716, for recombination with the second part 2718 and playback of the program file 2710. The second part 2718 could also be encrypted in place of, or in addition to, the first part 2716.

Figure 4A:
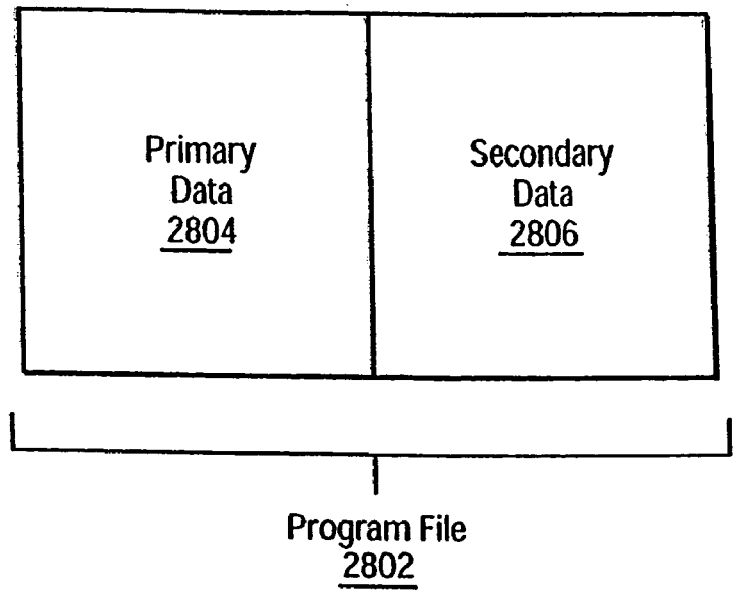
FIG. 4A illustrates an example of a scalably-coded program file.

In yet another embodiment, transmitter 121 employs scalable coding to increase the quality of audio output despite limitations in channel capacity. FIG. 4A is a block diagram illustrating an example of a scalably-coded program file, including data stored in two sections 2804, 2806 that together form a program file 2802. Primary set of data 2804 is sufficient to play back the program file 2802 at a low quality level. Secondary set of data 2806 may be added to the primary set 2804 for higher-quality playback. The sets of data 2804, 2806 may be stored separately in the content database 102 or with the signal files 1615, or may be stored in a combined state, to be separated and transmitted as needed.

Figure 4B:
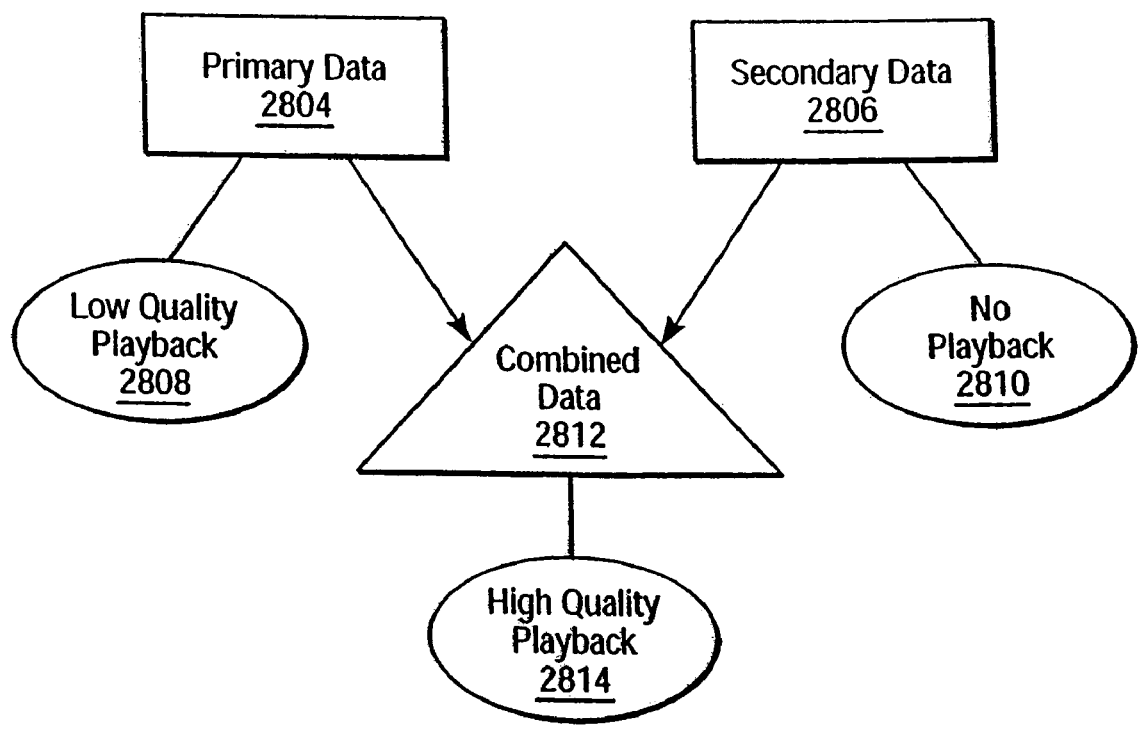
FIG. 4B is a block diagram illustrating the use and combination of primary data and secondary data to provide different playback quality levels.

FIG. 4B is a block diagram illustrating the use and combination of primary data 2804 and secondary data 2806 to provide different playback quality levels. As mentioned above, the primary data 2804 is sufficient to play back the program file 2802 at a low quality level 2808. In one embodiment, the secondary data 2806 alone does not provide information sufficient for playback 2810 of the program file 2802. However, when the secondary data 2806 is combined 2812 with the primary data 2804, the combined data 2812 is sufficient to play back the program file 2802 at a high quality level 2814. For example, if the program file 2802 is an audio file, low-quality audio can be produced using the primary data 2804. Audio cannot be produced with secondary information 2806 alone. If secondary information 2806 is combined with the primary information 2804, output quality is enhanced. In one embodiment, additional levels of information may also be provided, each of which can be combined with the lower levels to further enhance output quality. This allows caching of lower-quality audio received in a first session and later receiving secondary information 2806 in a second session, which enables the jukebox 103 to combine the primary and secondary information to output audio of increased quality.

Since different sets of data are available that successively improve program file 2802 quality level, the quality of the output by the jukebox 103 depends on how much data can be transmitted in the time available. The first time an audio track is transmitted, transmitter 121 provides jukebox 103 with the primary information 2804 first, which allows the jukebox 103 to playback a representation of the program file 2802. Secondary 2806 (and additional) information is transmitted to allow improved quality levels as time permits. Jukebox 103 outputs the audio track with whatever level of information it has received at the time output is to commence. If only primary information 2804 has been received, jukebox 103 outputs lower-quality audio. If secondary information 2806 has also been received, it is combined with the primary information 2804 and jukebox 103 outputs higher-quality audio.

In addition, jukebox 103, in one embodiment, caches the received information. If the same audio track is requested at a later time, transmitter 121 provides jukebox 103 with the next level of information. Therefore, even if jukebox 103 was unable to provide higher-quality audio during the first listening, it may be able to provide higher-quality audio during subsequent listenings, by combining secondary (and/or additional) information with the previously. cached primary information to generate the higher-quality audio output. Such a technique facilitates the output of high quality audio even when network transmission capacities are limited.

Figure 4C:
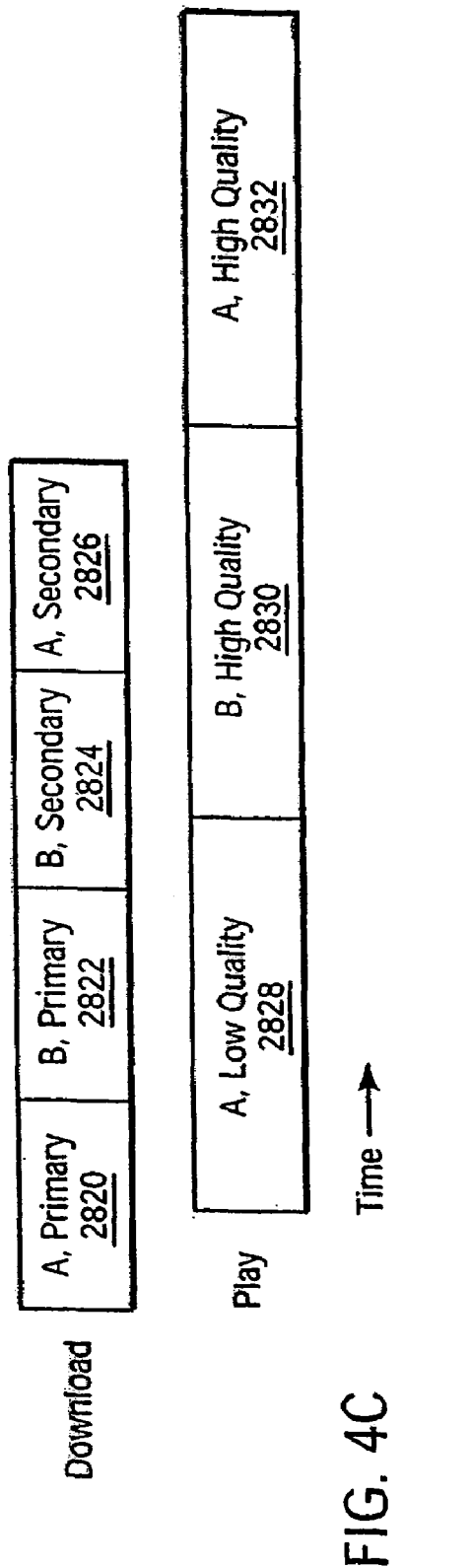
FIGS. 4C and 4D depict examples of scalable coding according to one embodiment of the present invention.

Referring now to FIG. 4C, there is shown an example of a transfer sequence for a channel with moderate bandwidth. Initially, tracks A and B are requested. Primary information for track A 2820 is downloaded. As primary information 2820 is downloaded, a low-quality representation of track A 2828 is played, according to conventional streaming audio techniques. Downloaded primary information 2820 is cached.

Once the download of primary information for track A 2820 is complete, jukebox 103 begins to download primary information for track B 2822. This download may begin even though track A is still playing 2828. In the example shown in FIG. 4C, the download of primary information for track B 2822 is completed while track A is still playing 2828. Therefore, jukebox 103 begins to download secondary information for track B 2824. Then, when playback 2828 of track A is finished, jukebox 103 is able to output a high quality representation of track B 2830, by combining secondary information 2824 with previously downloaded primary information 2822. The output of the high quality version 2830 may take place while secondary information 2824 is still being downloaded, again using streaming techniques.

In the example of FIG. 4C, a request to play track A a second time is received, Therefore, once secondary information 2824 has been downloaded, jukebox 103 begins to download secondary information for track A 2826. Once the high quality version of track B 2830 is finished playing, jukebox 103 outputs a high quality representation of track A 2832, by combining secondary information 2826 with previously downloaded primary information 2820.

Figure 4D:
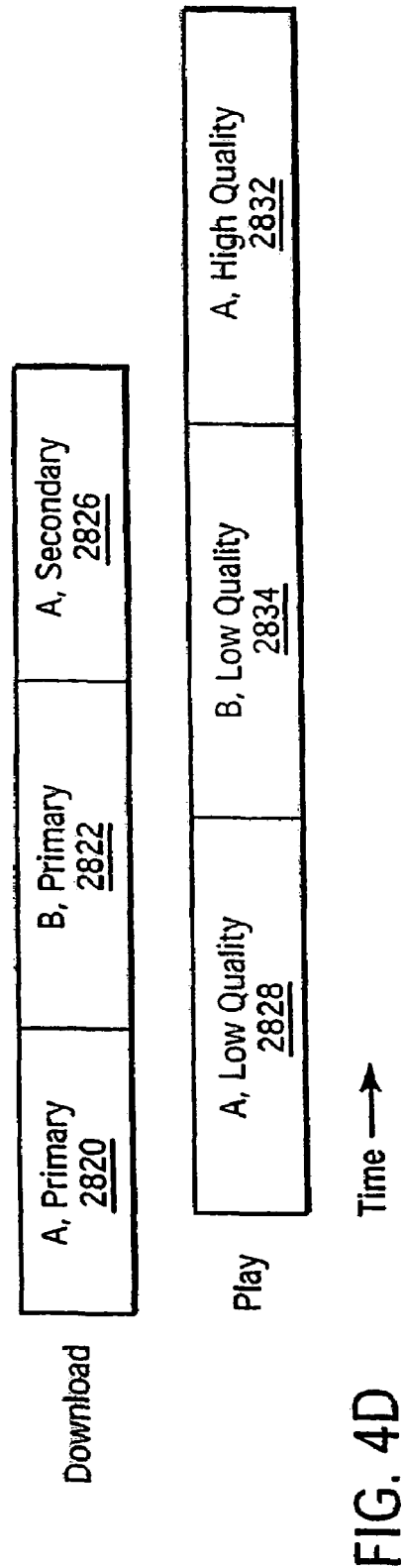

Referring now to FIG. 4D, there is shown another example of a transfer sequence for a channel with a lower bandwidth than that of FIG. 4C. Here, the secondary information for track B 2824 is not downloaded, because it would not arrive in time to improve the output of track B. Accordingly, a lower quality version of track B 2834 is output in lieu of the higher quality version 2830 of FIG. 4C. However, the higher quality version of track A 2832 can still be presented, since there is sufficient time to download secondary information for track A 2826 before the second playback of track A commences.

One skilled in the art will recognize that the tracks depicted in FIGS. 4C and 4D may refer to individual songs, or song segments, or any other unit of information. One skilled in the art will further recognize that the scalable coding techniques described herein may be applied to video data, or to any other type of data, and are not limited to audio data.

The scalable coding techniques of the present invention thus facilitate the trading off of quality in bandwidth-limited situations, without requiring complex bandwidth estimation and determination. If insufficient bandwidth exists for the delivery of higher-quality versions, the system simply continues playing lower quality versions of tracks. No skipping, pausing, or other interruption of the audio stream is necessary. Jukebox 103 can determine whether to continue any particular transfer to improve the available quality or to download the next requested track, based on upcoming track selections. At any given moment, the next data segment to request can be determined by requesting the highest priority data segment from the next few audio segments. In one embodiment, priorities are defined to either play audio at a maximum short-term quality level or at a consistent quality level.

In one embodiment, jukebox 103 requests data for downloading according to the following order of priorities:

| Priority | Type of value |
|---|---|
| 1 | Primary information, next track |
| 2 | Secondary information, next track |
| 3 | Primary information, track after next |
| 4 | Secondary information, track after next |
| 5 | Tertiary information, next track |
| 6 | Tertiary information, track after next |
| 7 | Data for subsequent tracks |

One skilled in the art will recognize that any desired priority list may be provided. For example, if item 5 in this table is moved up to the third rank, the system will give more priority to high quality presentation at the possible expense of inconsistent quality on lower bandwidth connections.

In one embodiment, locally-cached downloaded data is stored in an encrypted or otherwise protected form, so as to prevent its abuse and to inhibit copyright infringement. In another embodiment, primary information is stored in an encrypted or otherwise protected form, but secondary and subsequent information is not, since the secondary and subsequent information is unusable without access to the primary information.

In one embodiment, jukebox 103 downloads data sets when the user is not actually listening to music, so as to facilitate improved usage of an otherwise idle network connection. Jukebox 103 determines which items are likely to be requested by a user, so that at idle times it can transfer data that is likely to be useful for rendering audio segments in the future. Such determination may be made in the same way as described above with respect to the split files of FIG. 3D. In one embodiment, secondary information 2806 for such "predicted" audio segments is downloaded first, so that encryption is not required unless and until the user actually requests the tracks and the primary information 2804 is to be downloaded. Scalable coding may also be used to process a signal of a conventional broadcast radio station that plays music. An audio recognition device, as is conventional, pre-processes the signal in order to identify individual songs. Those portions of audio information that are not music are compressed and stored, and a transfer sequence is sent to jukebox 103 that references these recently encoded non-music segments as well as previously known and cached musical segments. The recently encoded segments can be encoded at a lower quality level in order to allow a jukebox 103 connected by a low speed line to transfer the recently encoded segments in real-time while still playing the cached musical segments at a higher quality level.

As with file splitting, portions of scalably coded files may also be sent on physical media rather than transmitted over a network. Similarly, if sections of scalably coded information are only partially transmitted, they may be stored locally, and then only the information not previously received is transmitted in a subsequent session.

Figure 5A:
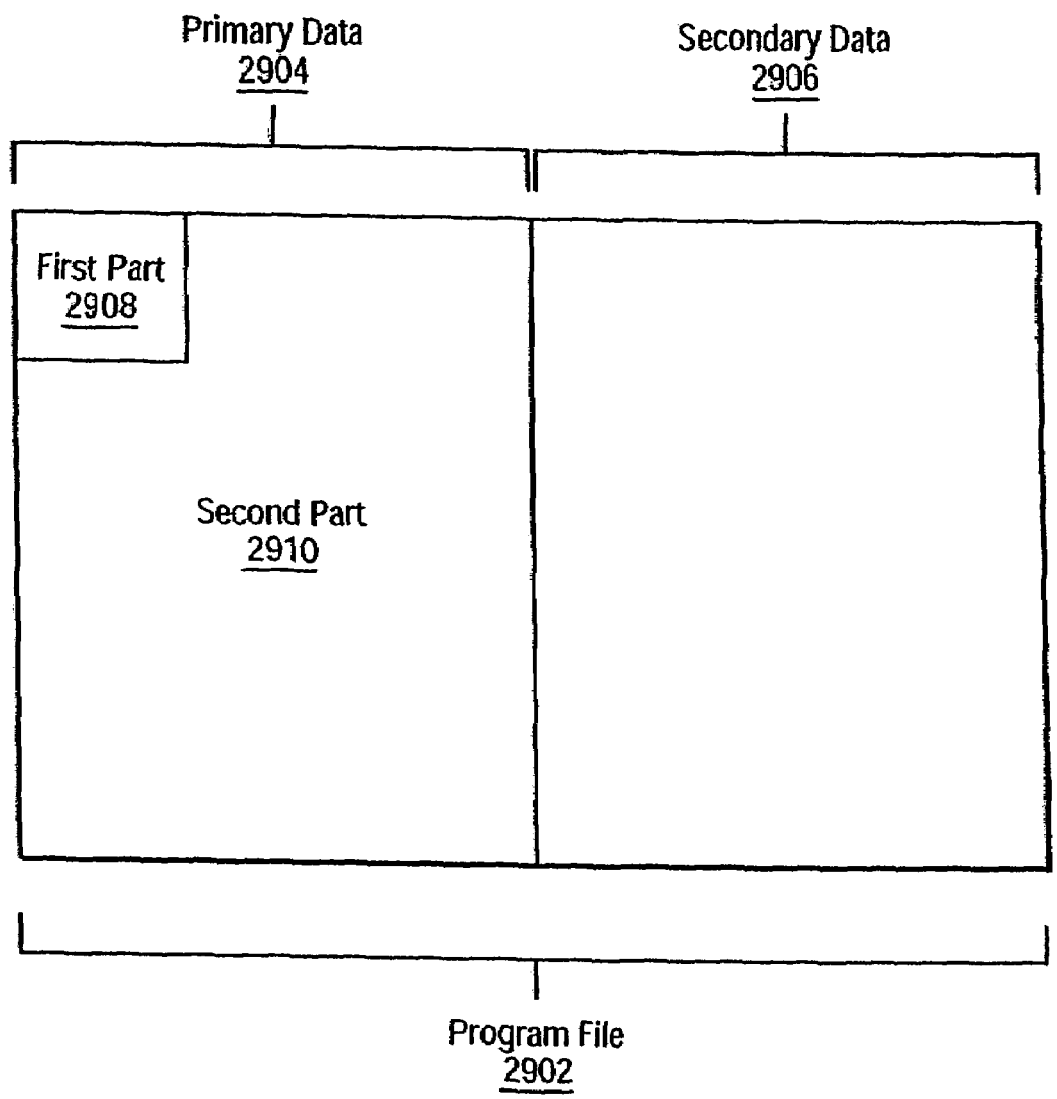
FIGS. 5A and 5B depict techniques for combining file splitting and scalable coding according to one embodiment of the present invention.

File splitting and scalable coding may also be used in combination. FIG. 5A is a block diagram illustrating how a program file 2902 may be divided into primary data 2904 and secondary data 2906, and the primary data 2904 file split into a first part 2908 and a second part 2910. The primary data 2904 is split as described above with respect to FIGS. 3A and 3B. This allows almost all of the primary data 2904 and secondary data 2906 to be cached locally without requiring encryption. Since, in one embodiment, the second part 2910 of the primary data 2904 is not playable without the first part 2908, and the secondary data 2906 is not playable without a playable set of primary data 2904, all of the program file 2902 except the first part 2908 of the primary data 2904 may be cached locally without providing the user with a usable copy of the program file 2902 that may be played back. This allows the server 1614 to retain control of playback of the program file 2902, as long as the first part 2908 of the primary data 2904 is not stored locally in a usable form.

Figure 5B:
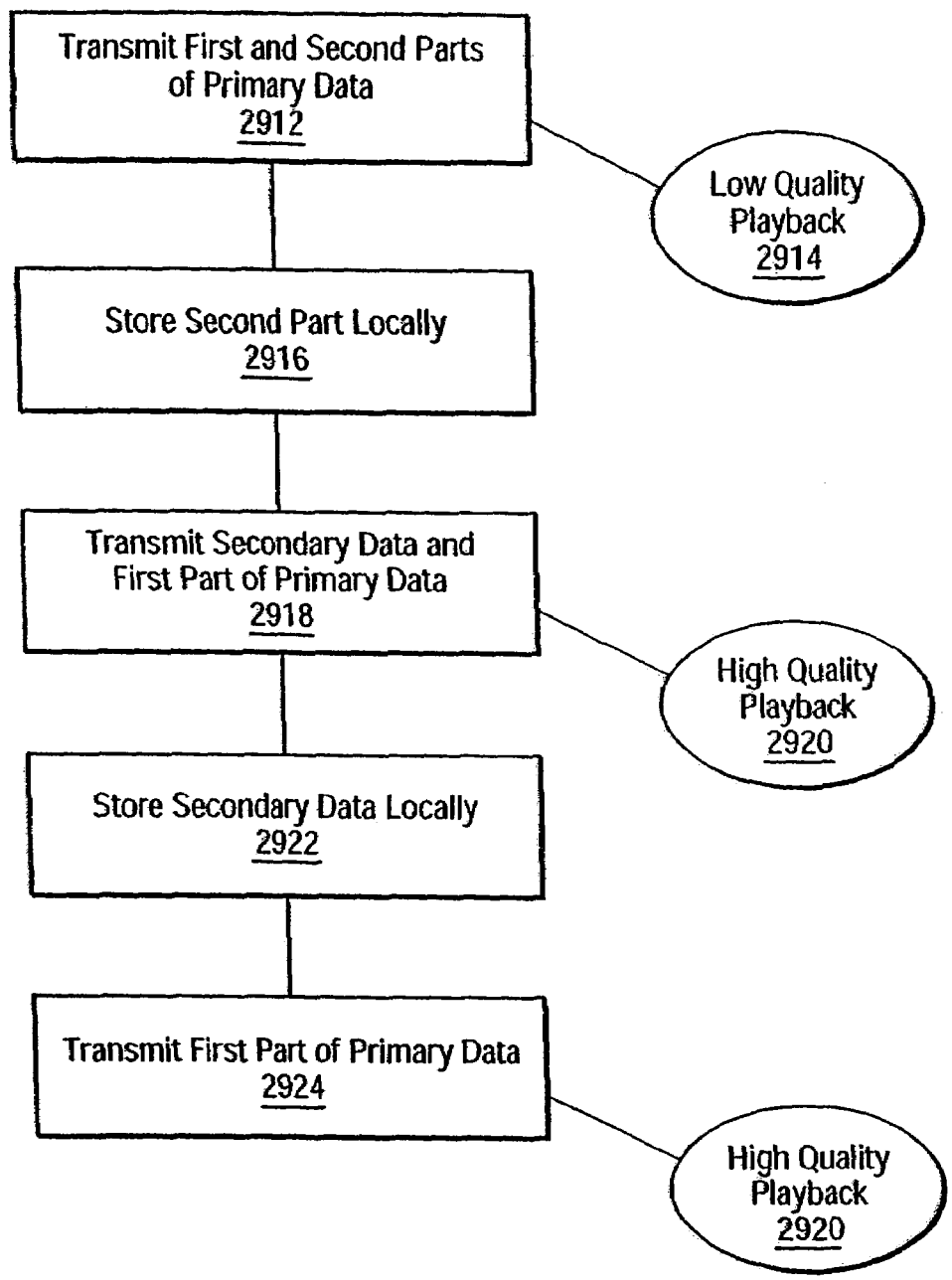

FIG. 5B is a block diagram that illustrates how such a scheme provides advantages for streaming program files 2902. First, the first and second parts 2908, 2910 of the primary data 2904 are transmitted 2912 to the client by the server 1614. The first and second parts 2908, 2910 may be transmitted at roughly the same time in response to the jukebox 103 requesting the program file 2902. Alternatively, the second part 2910 may be transmitted in advance, after determination of what files 2902 are likely to be desired, as described above with respect to FIG. 3D. In an embodiment wherein the second part 2910 is transmitted in advance, the first part 2908 is transmitted in response to the jukebox 103 requesting the program file 2902. The first and second parts 2908, 2910 are sufficient to provide low quality playback 2914. The second part 2910 is then stored 2916 locally, and the first part 2908 is discarded. At a later time, such as when the jukebox 103 requests the program file 2902 again, the server 1614 transmits 2918 the first part of the primary data 2908 and the secondary data 2906. This allows sufficient information for the program file 2902 to be played back at a high quality level 2920. The secondary data 2906 is stored locally 2922, and the first part 2908 of the primary data 2904 is discarded. For subsequent playback of the program file 2902, only the first part 2908 of the primary data 2904 need be transmitted 2924 in order to enable high quality level playback 2920. Again, after such playback, the first part 2908 of the primary data 2904 is discarded, so that the server may retain control of program file 2902 playback. As an alternative to discarding the first part 2908, the first part 2908 may be encrypted, with decryption only occurring under the server's 1614 control.

Thus, a significant portion of the program file 2902 may be stored locally, with only the relatively small first part 2908 being transmitted from the server 1614 to provide the user with streaming file performance. This allows high quality streaming performance even over a relatively narrow bandwidth connection.

As described above, when scalable coding or file splitting is used, the jukebox 103 plays back a representation of the program file. This representation may be an exact digital replica of the program file, such as when the program file is split, all parts are transmitted to the jukebox 103, and the entire file is combined for playback. The representation may also be a less than exact replica, such as when only some portions of a scalably coded program file are combined and played back.

Recommendation Engine

One method of determining in advance what program files a user may want streamed is through use of a recommendation engine, described more fully in U.S. patent application Ser. No. 09/846,823, filed on Apr. 30, 2001, pending. Note that there are also many other ways to determine what program files a user may want streamed in advance. Referring now to FIG. 2, the jukebox 103 or personalized radio station accepts a user's selections of music tracks and makes additional recommendations as to music tracks the user is likely to enjoy. The user is able to search for particular tracks and/or artists, and to control the playback of selected tracks. The system monitors the user's behavior with regard to searching, listening, and playback control, and generates and analyzes logs of such behavior in order to refine recommendations. Advertising, offers, and other information may be selected and presented to the user based on observations of user behavior and analysis as to which material may be of interest to the user.

Compressed signal files 1615 contain descriptions of music tracks, and in one embodiment contains digitized representations of the music tracks themselves. Compressed signal files 1615 are stored, for example, using conventional database storage means or in a conventional file system, and in one embodiment include several fields providing descriptive information regarding music tracks, such as title, album, artist, type of music, track length, year, record label, and the like.

Selected tracks are played via jukebox 103, which is implemented in one embodiment as a standalone application, or as a plug-in or bundled feature in browser 105. Jukebox 103 receives digitized representations of music tracks and plays the tracks over a speaker or headphones at the user's computer. In one embodiment, jukebox 103 can download and save music tracks in local storage (such as a hard disk drive, memory, or other local storage) in a compressed format, such as MP3, for playback on the user's computer or on a portable digital music listening device.

Recommendation engine 107 generates track preferences based on user information. Radio sequence generator 1613 uses track preferences, along with general constraints 1616 and format definitions 1611, to generate a sequence of tracks to be played. General constraints 1616 include particular rules and restrictions on the sequence of tracks, as may be required by law or as may be determined to be desirable for marketing or aesthetic purposes or for other reasons. Examples of constraints 1616 include: "no more than one song per hour from a particular album," or "do not play a fast song immediately after a slow song." Radio sequence generator 1613 may also incorporate a randomization element, if desired, and may be configurable by a website operator.

The track list is sent to jukebox 103 to be played to the user. A user activates jukebox 103 and selects music tracks for playback and/or purchase, via a user interface including controls and selectors. Authorization and content server 1614 checks that the appropriate security measures are in place (in order to prevent the user from "hacking" jukebox 103 to request unauthorized tracks from content server 1614), obtains the actual music tracks from files 1615, and provides them to jukebox 103 for output.

In one embodiment, the connections among the various elements of FIGS. 1A and 2 are implemented over the Internet, using known protocols such as HTTP and TCP/IP. Secure sockets layer (SSL) or other encryption techniques may be employed for added security.

The recommendation engine may be employed in connection with conventional radio station programming techniques, to implement an improved personalized radio station. As is known in the art, conventional radio stations typically divide a programming block into a number of segments. Each segment is assigned a programming category, such as "power hit," "new release," "recurrent hit," and the like. For a particular programming block, music tracks are assigned to each of the segments based on the particular programming format of the radio station. Music scheduling software, such as Selector® by RCS Sound Software, applies heuristic rules for repetition limits and classes of songs, to automatically generate track lists for use by radio stations. The recommendation engine may be combined with such existing radio station programming techniques, to populate the defined segments with music tracks that are likely to appeal to a particular listener. Additional rules may be applied in generating track lists, so as to limit undesired repetition and to comply with limiting legislation (such as the Digital Millennium Copyright Act) and other restrictions.

From the above description, it will be apparent that the invention disclosed herein provides a novel and advantageous system and method for providing a user with a streaming program file experience. The foregoing discussion discloses and describes merely exemplary methods and embodiments of the present invention. As will be understood by those familiar with the art, the invention may be embodied in other specific forms without departing from the spirit or essential characteristics thereof. For example, the invention may be applied to other domains and environments, and may be employed in connection with additional applications where personalized recommendations are desirable. Accordingly, the disclosure of the present invention is intended to be illustrative, but not limiting, of the scope of the invention, which is set forth in the following claims.

What is claimed is:

1. A method executable using one or more servers to transmit a media file, the method comprising:
   communicating in a first communication a second part of the media file, the second part being unusable without a first part;
   communicating in a second communication subsequent to the first communication the first part of the media file and not the second part of the media file, such that the media file can be experienced via a user device using at least part of the first and second parts after a start of the second communication and neither the first part nor the second part is independently usable to experience the media file.

2. The method of claim 1, such that the first and second parts of the media file are encoded, and the second part is undecodable without the first part.

3. The method of claim 1, such that the media file cannot be experienced via the user device without authorization.

4. The method of claim 3, such that authorization comprises the communication of the first part of the media file.

5. The method of claim 1, such that the second part is larger in size than the first part.

6. The method of claim 1, such that the second part comprises a certain percentage of the media file, and the first part comprises a remaining percentage of the media file.

7. The method of claim 1, such that the media file is divided into sections, the first part comprising a portion of a given section, and the second part comprising another portion of the given section.

8. The method of claim 7, such that the given section has a length, P, the first part's portion of the given section has a length, N, which is less than P, and the second part's portion of the given section has a length, P-N.

9. The method of claim 7, such that the given section has a length X, and each of the remaining sections has a length Y which is less than, equal to, or greater than X.

10. The method of claim 8 or 9, such that each length is measured in bits.

11. The method of claim 8 or 9, such that each length is measured in bytes.

12. A method of claim 1, further comprising:
communicating during the first communication the first part of the media file, such that the media file can be experienced at least in part via the user device using at least part of the first and second parts during the first communication.

13. The method of claim 1 or 12, such that the first part is only to be available to temporarily experience the media file via the user device.

14. The method of claim 1 or 12, such that the combined first and second parts are only to be available to temporarily experience the media file via the user device.

15. The method of claim 1, such that:
the media file further comprises a third part;
the first and second parts are combinable to experience the media file at a first quality level; and
the first, second, and third parts are combinable to experience the media file at a second quality level different than the first quality level.

16. The method of claim 15, such that the second quality level is higher than the first quality level.

17. The method of claim 15, such that the second quality level is lower than the first quality level.

18. The method of claim 15, further comprising:
communicating the third part of the media file, such that the third part can be combined with the first and second parts to experience the media file at the second quality level via the user device.

19. The method of claim 18, such that the third part is communicated in a communication other than the first communication.

20. The method of claim 18, such that the third part and not the second part is communicated in a communication other than the first communication.

21. The method of claim 18, such that the first part is only to be available to temporarily experience the media file via the user device.

22. The method of claim 18, such that the combined first, second and third parts are only to be available to temporarily experience the media file via the user device.

23. A method of transmitting a media file comprising:
communicating in a first communication a second part of the media file, neither the second part nor a first part of the media file is independently usable to experience the media file;
communicating in a second communication subsequent to the first communication the first part of the media file and not the second part of the media file,
such that the media file is divided into a plurality of sections, the first part of the media file comprising a portion of each section, and the second part of the media file comprising another portion of each section, such that the first part communicated in the second communication and the second part communicated in the first communication can be combined so that the media file can be experienced via the user device.

24. The method of claim 23, such that a given one of the sections has a length, P, the first part's portion of the given section has a length, N, which is less than P, and the second part's portion of the given section has a length, P-N.

25. The method of claim 23, such that a given one of the sections has a length X, and each of the remaining sections has a length Y, which is less than or equal to Y.

26. The method of claim 24 or 25, such that each length is measured in bits.

27. The method of claim 24 or 25, such that each length is measured in bytes.

28. A method of transmitting a media file comprising:
communicating to a user device in a first communication a second part of the media file, neither the second part nor a first part of the media file is independently usable to experience the media file;
communicating to the user device in a second communication subsequent to the first communication the first part of the media file and not the second part of the media file, the first part comprising headers, compression table selectors and scale factors of the media file,
such that at least part of the first and second parts can be combined to experience at least a portion of the media file via the user device after the start of the second communication.

29. A method of transmitting a media file comprising:
communicating to a user device in a first communication a first part of the media file, the media file capable of being experienced at a first quality level using the first part of the media file;
communicating to the user device a second part of the media file the first and second parts are combinable to experience the media file at a second quality level different than the first quality level, and only the second part, which is unusable without the first part, is to be retained in a store local to the user device for subsequent access by the user device;
communicating to the user device in a second communication subsequent to the first communication the first part of the media file and not the second part of the media file, so that the first part can be combined with the retained second part to experience the media file via the user device, and neither the first part nor the second part is independently usable to experience the media file at the second quality level.

30. The method of claim 29, such that the first part is only to be available to temporarily experience the media file via the user device.

31. The method of claim 29, such that the media file can be experienced via the user device after combining the first and second parts.

32. The method of claim 29, such that the media file can be experienced via the user device using at least the first part.

33. The method of claim 32, such that the media file can be experienced using the second part as well as the first part if both the first part and the second part are available to the user device prior to a time at which the media file is to be experienced via the user device.

34. A method of transmitting a media file comprising:
communicating to a user device in a first communication a second part of the media file, the second part is to be retained in a store local to the user device, neither the second part nor a first part of the media file is independently usable to experience the media file;

communicating to the user device in a second communication subsequent to the first communication the first part of the media file and not the second part of the media file, such that the first part communicated in the second communicated can be combined with a retained second part after the start of the second communication to experience the media file via the user device, such that the media file is divided into a plurality of sections, the first part comprising a portion of each section, and the second part comprising another portion of each section.

35. The method of claim 34, such that a given one of the sections has a length, P, the first part's portion of the given section has a length, N, which is less than P, and the second part's portion of the given section has a length, P-N.

36. The method of claim 34, such that a given one of the sections has a length X, and each of the remaining sections has a length Y, which is less than or equal to Y.

37. The method of claim 35 or 36, such that each length is measured in bits.

38. The method of claim 35 or 36, such that each length is measured in bytes.

39. A method of receiving a media file to be experienced via a user device comprising:

receiving in a first communication a second part of the media file, the second part is unusable to experience the media file without being combined with a first part;

storing the second part;

receiving in a second communication subsequent to the first communication the first part of the media file and not the second part of the media file; and combining the first part with the stored second part after the start of the second communication, so that the media file can be experienced via the user device, and neither the first part nor the second part is independently usable to experience the media file.

40. The method of claim 39, such that the first and second parts of the media file are encoded, and the second part is undecodable without the first part.

41. The method of claim 39, such that the media file cannot be experienced via the user device without authorization.

42. The method of claim 41, such that authorization comprises receipt of the first part of the media file.

43. The method of claim 39, such that the second part is larger in size than the first part.

44. The method of claim 39, such that the second part comprises a certain percentage of the media file, and the first part comprises a remaining percentage of the media file.

45. The method of claim 39, such that the media file is divided into sections, the first part comprising a portion of a given section, and the second part comprising another portion of the given section.

46. The method of claim 45, such that the given section has a length, P, the first part's portion of the given section has a length, N, which is less than P, and the second part's portion of the given section has a length, P-N.

47. The method of claim 45, such that the given section has a length X, and each of the remaining sections has a length Y which is less than, equal to, or greater than X.

48. The method of claim 46 or 47, such that each length is measured in bits.

49. The method of claim 46 or 47, such that each length is measured in bits.

50. The method of claim 39, further comprising:

receiving during the first communication the first part of the media file, such that the media file can be experienced at least in part via the user device using at least part of the first and second parts during the first communication.

51. The method of claim 39 or 50, such that the first part is only to be available to temporarily experience the media file via the user device.

52. The method of claim 39 or 50, such that the combined first and second parts are only to be available to temporarily experience the media file via the user device.

53. The method of claim 39, such that:

the media file further comprises a third part;

the first and second parts are combinable to experience the media file at a first quality level; and the first, second, and third parts are combinable to experience the media file at a second quality level different than the first quality level.

54. The method of claim 53, such that the second quality level is higher than the first quality level.

55. The method of claim 53, such that the second quality level is lower than the first quality level.

56. The method of claim 53, further comprising:

receiving the third part of the media file;

storing the third part;

combining the received third part with the stored first part and the stored second part so that the media file can be experienced at the second quality level via the user device.

57. The method of claim 53, such that the third part is received in a communication other than the first communication.

58. The method of claim 53, such that the third part and not the second part is received in a communication other than the first communication.

59. The method of claim 53, such that the first part is only to be available to temporarily experience the media file via the user device.

60. The method of claim 53, such that the combined first, second, and third parts are only to be available to temporarily experience the media file via the user device.

61. A method of receiving a media file to be experienced via a user device comprising:

receiving in a first communication a second part of the media file, neither the second part nor a first part of the media file is independently usable to experience the media file;

storing the second part;

receiving in a second communication subsequent to the first communication the first part of the media file and not the second part of the media file;

combining the first part received in the second communication with the stored second part after the start of the second communication, so that the media file can be experienced via the user device, such that the media file is divided into a plurality of sections, the first part of the media file comprising a portion of each section, and the second part of the media file comprising another portion of each section.

62. The method of claim 61, such that a given one of the sections has a length, P, the first part's portion of the given section has a length, N, which is less than P, and the second part's portion of the given section has a length, P-N.

63. The method of claim 61, such that a given one of the sections has a length X, and each of the remaining sections has a length Y, which is less than or equal to Y.

64. The method of claim 62 or 63, such that each length is measured in bits.

65. The method of claim 62 or 63, such that each length is measured in bytes.

66. A method of receiving a media file to be experienced via a user device comprising:
   receiving in a first communication a second part of the media file, neither the second part nor a first part of the media file is independently usable to experience the media file;
   storing the second part;
   receiving in a second communication subsequent to the first communication the first part of the media file and not the second part of the media file, the first part comprising headers, compression table selectors and scale factors of the media file; and
   combining the first part received in the second communication with the stored second part after the start of the second communication, so that the media file can be experienced via the user device.

67. A method of receiving a media file to be experienced via a user device comprising:
   receiving in a first communication a first part of the media file, the media file capable of being experienced at a first quality level using the first part of the media file;
   receiving a second part of the media file, the second part being unusable without the first part, and the first and second parts being combinable to experience the media file at a second quality level different than the first quality level;
   storing the second part;
   receiving in a second communication subsequent to the first communication the first part of the media file and not the second part of the media file;
   combining the received first part with the stored second part, so that the media file can be experienced via the user device, and neither the first part nor the second part is independently usable to experience the media file at the second quality level.

68. The method of claim 67, such that the first part is only to be available to temporarily experience the media file via the user device.

69. The method of claim 67, such that the media file can be experienced via the user device after combining the first and second parts.

70. The method of claim 67, such that the media file can be experienced via the user device using at least the first part.

71. The method of claim 70, such that the media file can be experienced using the second part as well as the first part if both the first part and the second part are available to the user device prior to a time at which the media file is to be experienced via the user device.

72. A method of receiving a media file to be experienced via a user device comprising:
   receiving in a first communication a second part of the media file, neither the second part nor a second part of the media file is independently usable to experience the media file;
   storing the second part;
   receiving in a second communication subsequent to the first communication a first part of the media file and not the second part of the media file;
   combining the first part received in the second communication with the stored second part after the start of the second communication, so that the media file can be experienced via the user device,
   such that the media file is divided into a plurality of sections, the first part comprising a portion of each section, and the second part comprising another portion of each section.

73. The method of claim 72, such that a given one of the sections has a length, P, the first part's portion of the given section has a length, N, which is less than P, and the second part's portion of the given section has a length, P-N.

74. The method of claim 72, such that a given one of the sections has a length X, and each of the remaining sections has a length Y, which is less than or equal to Y.

75. The method of claim 73 or 74, such that each length is measured in bits.

76. The method of claim 73 or 74, such that each length is measured in bytes.

* * * * *